US012561248B2

(12) United States Patent
Robinson

(10) Patent No.: US 12,561,248 B2
(45) Date of Patent: Feb. 24, 2026

(54) SNOOP FILTER ENTRY USING A PARTIAL VECTOR

(71) Applicant: Microsoft Technology Licensing, LLC, Redmond, WA (US)

(72) Inventor: Eric Francis Robinson, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/493,951

(22) Filed: Oct. 25, 2023

(65) Prior Publication Data

US 2025/0139008 A1 May 1, 2025

(51) Int. Cl.
G06F 12/0831 (2016.01)
G06F 12/0891 (2016.01)

(52) U.S. Cl.
CPC ...... G06F 12/0831 (2013.01); G06F 12/0891 (2013.01)

(58) Field of Classification Search
CPC .......................... G06F 12/0831; G06F 12/0891
See application file for complete search history.

(56) References Cited

U.S. PATENT DOCUMENTS 10,657,055 B1    5/2020  Jalal
2006/0294314 A1  12/2006 Cheng

| | | | | | |
|---|---|---|---|---|---|
| 2016/0117249 | A1* | 4/2016 | Lin | ...................... | G06F 12/0833 |
| | | | | | 711/119 |
| 2017/0286299 | A1* | 10/2017 | Sury | ................... | G06F 12/0811 |
| 2018/0004663 | A1 | 1/2018 | Jalal | | |
| 2020/0042446 | A1 | 2/2020 | Mittal | | |
| 2022/0308999 | A1* | 9/2022 | Randall | ............... | G06F 12/0831 |
| 2023/0305960 | A1* | 9/2023 | Polishuk | ............. | G06F 12/0815 |
| 2024/0273025 | A1* | 8/2024 | Zhang | ................. | G06F 12/0833 |

OTHER PUBLICATIONS

Patel, A. (2008). Energy efficient MESI cache-coherence with pro-active snoop filtering for multicore microprocessors. ProQuest Dissertations & Theses. (Year: 2008).*
International Search Report and Written Opinion received for PCT Application No. PCT/US2024/048068, Nov. 8, 2024, 13 pages.

* cited by examiner

*Primary Examiner* — Reginald G Bragdon
*Assistant Examiner* — Zakaria Mohammed Belkhayat
(74) *Attorney, Agent, or Firm* — Seed Intellectual Property Law Group LLP

(57) ABSTRACT

The described technology provides a method including generating a full tracking vector wherein each bit of the full tracking vector indicates cache validity state of a coherence granule (cogran) in agent cache for a related agent, dividing the tracking vector into a plurality of partial vectors (PVECs), for each PVEC, determining whether cache validity state of at least one bit in the PVEC is set to valid, and in response to determining that cache validity state of at least on bit in a given PVEC is set to valid, storing the given PVEC and its PVEC pointer in a tracking_info field of a base snoop filter (SFT) entry for the cogran, wherein the PVEC pointer indicates the location of the given PVEC in the full tracking vector.

20 Claims, 19 Drawing Sheets

200

214    216

| entry<br>state | tracking<br>mode |
|---|---|
| IDLE | NA |
| SEARCHABLE | PVEC |
| | AID |
| | IMPRECISE |

| SEARCHABLE_E | PVEC |
|---|---|
| EXTRA | NA |

800

802

1000

Begin
Switch-To-
IMPRECISE

1004

Set SFT base entry's
tracking_mode = IMPRECISE

1006

Update imprecise tracking for
any currently-tracked agents

1008

Add new agent to imprecise
tracking

End

1600

SNOOP FILTER ENTRY USING A PARTIAL VECTOR

BACKGROUND

A processor-based device may include multiple processing elements (PEs) (e.g., processor cores, as a non-limiting example) that each provide one or more local caches for storing frequently accessed data. Because the multiple PEs of the processor-based device may share a memory resource such as a system memory, multiple copies of shared data read from a given memory address may exist at the same time within the system memory and within the local caches of the PEs. Thus, to ensure that all of the PEs have a consistent view of the shared data, the processor-based device provides support for a cache coherence protocol to enable local changes to the shared data within one PE to be propagated to other PEs.

SUMMARY

The described technology provides a method including generating a full tracking vector wherein each bit of the full tracking vector indicates cache validity state of a coherence granule (cogran) in agent cache for a related agent, dividing the tracking vector into a plurality of partial vectors (PVECs), for each PVEC, determining whether cache validity state of at least one bit in the PVEC is set to valid, and in response to determining that cache validity state of at least one bit in a given PVEC is set to valid, storing the given PVEC and its PVEC pointer in a tracking_info field of a base snoop filter (SFT) entry for the cogran, wherein the PVEC pointer indicates the location of the given PVEC in the full tracking vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
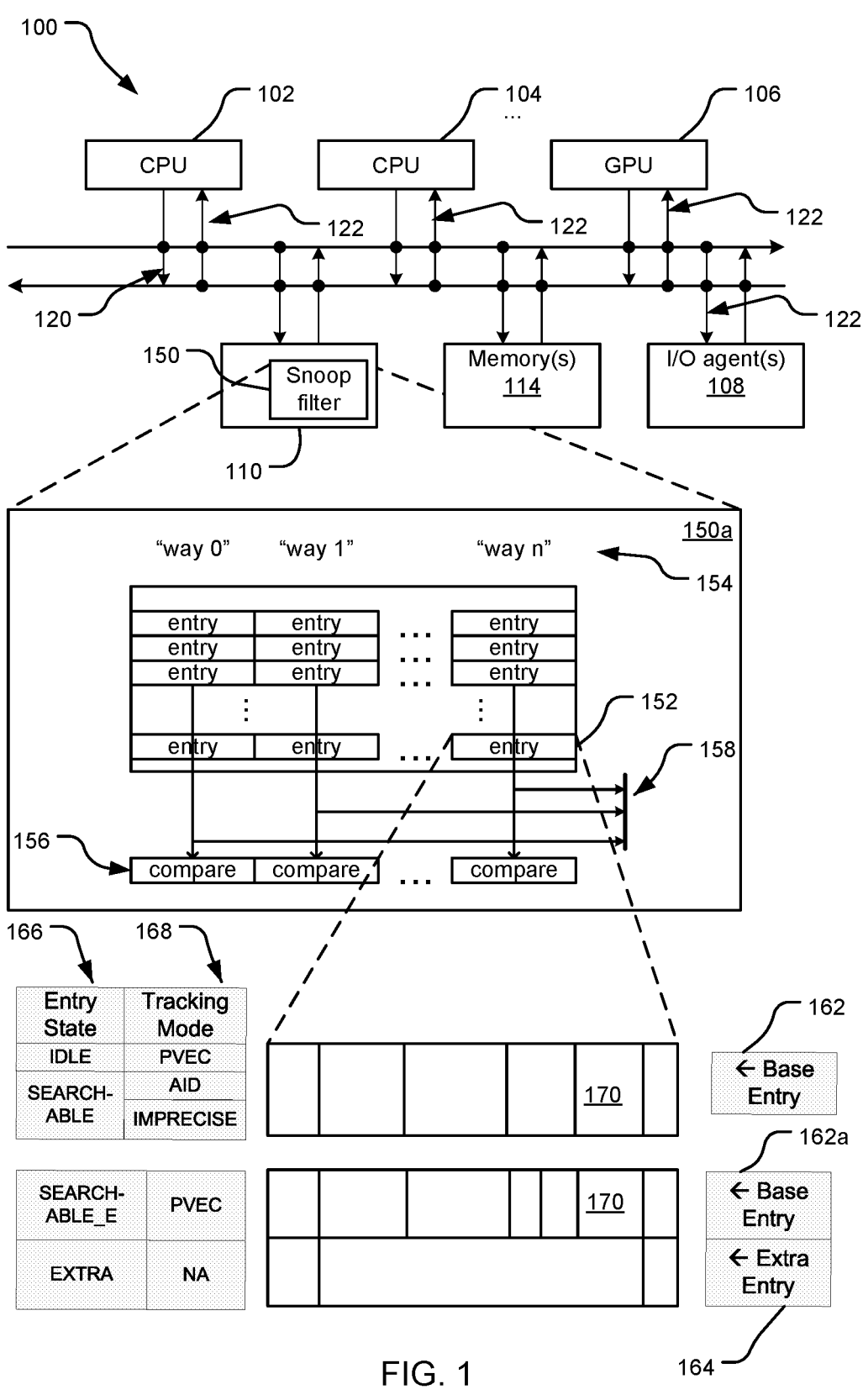
FIG. 1 illustrates an implementation of a system providing cache coherence using snoop filters.

Implementations disclosed herein disclose multi-processor systems that employ hardware (HW)-enforced cache coherency in which when an agent, such as a CPU, a GPU, etc., wants to access a memory location, HW automatically determines whether another agent currently holds a copy of that memory location. If the access is a read and the memory location is cached by another agent, system memory might be stale, in which case the access must be satisfied by obtaining the data from the other agent's cache. If the access is a write, typically other cached copies must be first written back to system memory. The memory block for which HW-enforced cache coherency is maintained is called a coherence granule (cogran) and system may match its cogran size to the cache line size.

In some implementations, the system may maintain a list of which cograns are currently cached by which agents. In other implementations, there may be no central coherence directory that needs to be maintained, and instead, during the course of handling the requested memory access, all agents are queried to determine whether any holds a copy of the cogran in their cache. This query is commonly referred to as a snoop. An over-snoop condition occurs when an agent is snooped to search for a cogran in its cache and that agent does not currently hold a copy of that cogran. The snoop is functionally useless and unnecessarily perturbs that agent. A system disclosed herein discloses advantageous implementations using a snoop filter (SFT) to help reduce over-snooping. Such implementations reduce over-snooping penalties in terms of latency added to the memory access, interconnect bandwidth consumed for no functional benefit, and energy wasted to perform unnecessary cache lookup(s)

at the agents that are over-snooped. A snoop filter may be thought of as a higher-level, inclusive, set-associative cache that has no data and whose purpose is to track the entire set of cograns held by the lower-level cache(s) for which cache coherence needs to be maintained.

An imprecise snoop filter is a filter that tracks that a cogran has been cached by some agent at some point. This SFT is smaller than other types but the lack of precision means that when a snoop needs to be sent, all coherent caches in the system need to be snooped. The lack of precision also means that the SFT generally loses the ability to detect when the cogran has been evicted from all the coherent caches.

A precise snoop filter may employ a vector to track exactly which agents have cached a copy of a cogran. A precise SFT requires a relatively large amount of area to implement because it tracks a lot of states, 1 bit per agent per cogran tracked. In such an implementation, when an agent obtains a copy of a cogran to write into its cache, the agent's corresponding vector bit in the SFT entry tracking that cogran is set. When the agent later evicts the cogran, its corresponding vector bit in the SFT entry tracking that cogran is cleared. This has a couple of advantages over the imprecise SFT: (a) only the exact agents that need to be snooped will be snooped; (b) the snoop scope can be further reduced over time as individual agents evict the cogran from their caches and the SFT is updated accordingly, this applies only to evictions that the agents communicate to the SFT.

In a hybrid implementation an SFT may track precisely (n) agents (typically, 2-3) by recording their agent ID (AID) in the SFT's cogran tracking entry. The AID may be a unique identifier for each agent that the SFT tracks. For example, the AID could be an encode of the SFT vector position that agent may otherwise set. Alternatively, the AID may be the agent's interconnect address—the ID used by the interconnect to send messages to that agent. When >(n) agents have cached a copy of the cogran, the SFT switches from AID-tracking to imprecise-tracking. When the hybrid implementation is in an AID-tracking mode, there are no over-snoops because the SFT entry knows exactly whom to snoop. On the other hand, when the hybrid implementation is in an imprecise-tracking mode, the SFT entry indicates that all agents need to be snooped if the cogran is currently held, or tracked, by the SFT. When the system has many coherent agents (e.g., 128), this approach employs less HW than the precise vector SFT—recording (n) AIDs (for a small enough n) requires fewer state bits than a large vector.

In a system with many coherent agents (e.g., 128) the over-snooping due to imprecise tracking is very costly in terms of fabric bandwidth consumed and energy wasted. Furthermore, the larger SFT needed for precise tracking is very costly in terms of area which also causes snoop (and other) message travel distances to grow. Workloads with many agents sharing data structures or sharing instruction pages may quickly exhaust the precise-AID tracking ability of the hybrid approach and may lead to the imprecise tracking_mode being used more often. While some amount of over-snooping may be tolerated because the various imprecise tracking modes generally don't have the ability to recover back to precise tracking as cograns are evicted, snoop filter management itself incurs an over-snooping overhead. Specifically, when the snoop filter is unable to know which cograns are no longer cached by any agents, the snoop filter may more frequently send "filter flush" snoops to make room in the SFT itself so that it may install a newly tracked cogran in the SFT.

Alternative implementations of SFT removes the full SFT tracking vector from every SFT entry and instead uses a separate, smaller structure (DVT) to hold the full tracking vectors for the SFT entries that need to track more than (n) AIDs. This reduces the tracking information that each SFT entry needs to carry but comes with the risk that there aren't enough entries in the DVT to cover the number of cograns that are shared by >n AIDs concurrently. As the DVT's size is increased to mitigate this risk, the system approaches having full tracking vectors in each SFT entry.

Yet another alternative implementation of SFT removes the full SFT tracking vector from every SFT entry and enables an SFT entry to be paired with a second SFT entry to form a logical SFT entry that's comprised of two physical SFT entries; this then enables the full tracking vector to be recorded across the pair of SFT entries. This reduces the tracking information that each SFT entry needs to carry, but still requires a minimum size for the SFT entry pair to be able to hold a full tracking vector which can become a problem when there are a large number of agents to track, such as when a system has >=128 agents needing to be tracked.

The implementations of SFT disclosed herein take advantage of the fact that although data sharing occurs between different agents of the same virtual machine (VM), there is rarely (if ever) data sharing between different VMs. Scheduling software attempts to improve performance and save energy by deploying a VM within a single cluster of agents when possible. Generally, that cluster is on the same die or same non-uniform memory access (NUMA) domain but could exist on other boundaries such as half-die. Sometimes the agents of a VM end up being spread across multiple die or multiple NUMA domains. The technology disclosed herein retains the concept of a full tracking vector for each cogran and takes advantage of scheduling SW's preference to consider the locations of available agents when determining to which set of agents it will assign a VM. Specifically, implementations of the SFT disclosed herein divides the full tracking vector into a number of partial vectors. If a scheduling SW is already attempting to limit the deployment of each VM to a single group of CPUs, then HW can use this to determine partial vector boundaries. By enabling an SFT entry to track only a single partial vector, each SFT entry can be further reduced in size. If a VM is deployed in a way that ends up spanning multiple partial vectors, then the SFT entry may acquire an extra entry to hold one or more additional partial vectors as needed to track the sharing of the cogran that's being tracked by that SFT entry.

For the cache coherence system disclosed herein, the term physical SFT entry (or physical entry) is used to refer to a base entry when it contains information needed to perform a lookup of a cogran in the SFT. A physical SFT entry is an extra entry when it can't stand alone, and it contains additional information that its associated base entry is unable to hold. The term logical SFT entry (or logical entry) is used to refer to a base entry for a cogran and it may also include an extra SFT entry. A logical SFT entry contains all the information needed to perform a lookup of a cogran in the SFT and all the known tracking information (i.e., who has cached) for that cogran. In various implementations disclosed herein, a logical entry may be an aggregation of a base SFT entry and its associated SFT extra entry (if the extra entry is in use) or only a base SFT entry when it has no associated extra SFT entry.

Generally, a base SFT entry contains sufficient information to determine whether the SFT is currently tracking a cogran of interest and provides some ability to track whom to snoop. A base SFT entry may or may not stand alone in its tracking of a cogran. An extra SFT entry provides capacity to hold more agent tracking information than can fit in a base SFT entry by itself. An extra SFT entry can't stand alone and is always paired with a base SFT entry.

Furthermore, as used herein, the term full vector (or full tracking vector) refers to a vector that provides 1 bit per agent in the system that may need to be tracked for a cogran. Thus, each agent has a predefined bit, and by determining which bits of the full vector held by an SFT entry are set, it can be precisely determined which agent(s) need to be snooped when a memory location is accessed. A partial vector (PVEC or partial tracking vector) refers to a fraction of the full vector that an SFT entry would otherwise need to hold. If, for example, a full vector was divided into 4 pieces, the resulting partial vectors could be identified as being the 1st, 2nd, 3rd, or 4th partial vector of the full vector. By having a partial vector and knowing its place within the full vector, it can be precisely determined which agent(s) represented by that partial vector need to be snooped when a memory location is accessed.

FIG. 1 discloses an implementation of a cache coherence system 100 using snoop filters that improves upon one or more of the above implementations. Specifically, the cache coherence system 100 may be implemented on a multi-core architecture that includes a number of central processing unit (CPU) cores, 102 and 104, a graphical processing unit (GPU) 106, one or more input/output (I/O) agents 108, a point of serialization (PoS) 110, and a memory 114. Although the present example shows two CPU cores and one GPU, it is understood that any number of CPU cores and GPUs can be used without deviating from the scope of the present disclosure. Examples of the I/O agents 108 include, but are not limited to, Industry Standard Architecture (ISA) devices, Peripheral Component Interconnect (PCI) devices, PCI-X devices, PCI Express devices, Universal Serial Bus (USB) devices, Advanced Technology Attachment (ATA) devices, Small Computer System Interface (SCSI) devices, and InfiniBand devices.

The processing unit cores 102, 104, 106, and the I/O agents 108 may be referred to as agents 102-108, each referenced by agent IDs (AIDs). These agents 102-108 may have multiple levels of internal caches such as L1, L2, and L3 caches. As the agents 102-108 cache coherent memory blocks (cograns) in their internal caches, a snoop filter (SFT) 150 may keep track of those cograns and of which agents 102-108 have cached each one. Any of the agents 102-108 may issue coherent or non-coherent requests and the PoS 110 ensures the serialization of the memory access requests using the snoop filter 150 to provide memory coherency.

For example, the PoS 110 receives a coherent request 120 from a CPU 102. In response to the coherent request 120, the PoS 110 issues a snoop command 122 to the CPU cores 104, the GPU 106, and the I/O agents 108. The CPU cores 104, the GPU 106, and the I/O agents 108 may provide the requested coherent information back to the PoS 110. When sending the snoop 122, the PoS 110 refers to the SFT 150.

An example implementation of the SFT 150 is illustrated by SFT 150a. The SFT 150a includes a data structure to track the address and agent(s) 102-108 that have obtained a copy of every cogran that is currently cached by agents 102-108. The SFT 150a may be an n-way filter as indicated by n-arrays 154. The snoop filter 150a may include an array of entries 152, the content of the entries 152 is further described below. Each of the entries 152 may include a Tag field, such as the Tag field 218 disclosed in FIG. 2, that is used to store a tag portion of physical address (PA) that identifies a cogran. For example, for cogran size of 64 bytes, PA width of 48 bits, SFT having 1024 sets, and SFT being a 16-way associative SFT, bits 15:6 of the PA may be used to select an SFT set and bits 47:16 of the PA may be stored as the tag in the Tag field 218 of the SFT entries 152. When the SFT 150a needs to perform a lookup to see if a cogran's PA is present in the SFT 150a, it selects the set using that cogran's PA[15:6]. Subsequently, for the selected set, the SFT 150a may compare 156 the PA[47:16] against the tag values stored in the Tag field 218 of the 16 SFT entries 152 in the selected set. If the Tag field 218 of any of the 16 SFT entries in the selected set finds a match, then its way (e.g., way 5) is currently tracking the cogran being looked up.

In an implementation of the SFT 150a disclosed herein, a logical entry 152 may be configured to hold a partial vector (PVEC) in a base SFT entry 162 and to dynamically allocate an extra SFT entry 164 in an SFT set for the cases where base SFT entry 162 cannot hold additional PVECs. Specifically, the SFT 150a may need to track up to 128 agents, however, these 128 agents may be divided into four (4) clusters of agents that need to be tracked by the SFT 150a. Furthermore, the SFT entry 152 also includes an entry_state field 166, a tracking_mode field 168, and a tracking_info field 170. According to the implementation of the cache coherence system disclosed herein, the tracking_mode field 168 may take three different values, namely: PVEC, AID, and IMPRECISE.

For example, when the cache coherence system allocates an SFT entry, such as the SFT entry 152, to track a cogran, it begins by setting the SFT entry 152's tracking_mode 168 to AID and records the agent's AID in the tracking_info field 170. When another agent becomes a new sharer of that cogran, the another agent needs to be added to the SFT entry 152's tracking for that cogran. In that case, the SFT entry 152's tracking_mode 168 is kept to AID if there is an available AID subfield in the SFT entry 152's tracking_info field 170 that can hold the new agent's AID. If more than a predetermined number of agents need to be tracked and they all fall within a single PVEC, the tracking_mode 168 of the SFT entry 152 is changed to PVEC. For example, the predetermined number may be four (4). In such example implementation, if more than the predetermined number of agents need to be tracked, with the predetermined number of agents being four (4), and they all do not fall within a single PVEC, but all do fall within three partial vectors, the cache coherence system acquires an extra entry 164, changes the entry_state 166 of the extra SFT entry 164 to EXTRA, changes the tracking_mode 168 of the base SFT entry 162a to PVEC, and changes the entry_state 166 of the base SFT entry 162a to SEARCHABLE_E. In the illustrated implementation, if more than four agents need to be tracked and they are spread across more than three partial vectors, the SFT entry 152's tracking_mode 168 is changed to IMPRECISE. However, in an alternative implementation, if more than m agents need to be tracked and they are spread across more than n partial vectors, the SFT entry 152's tracking_mode 168 is changed to IMPRECISE, thus, the switch to IMPRECISE occurs if the number of agents to be tracked exceeds the ability of the SFT entry to track them.

Figure 2:
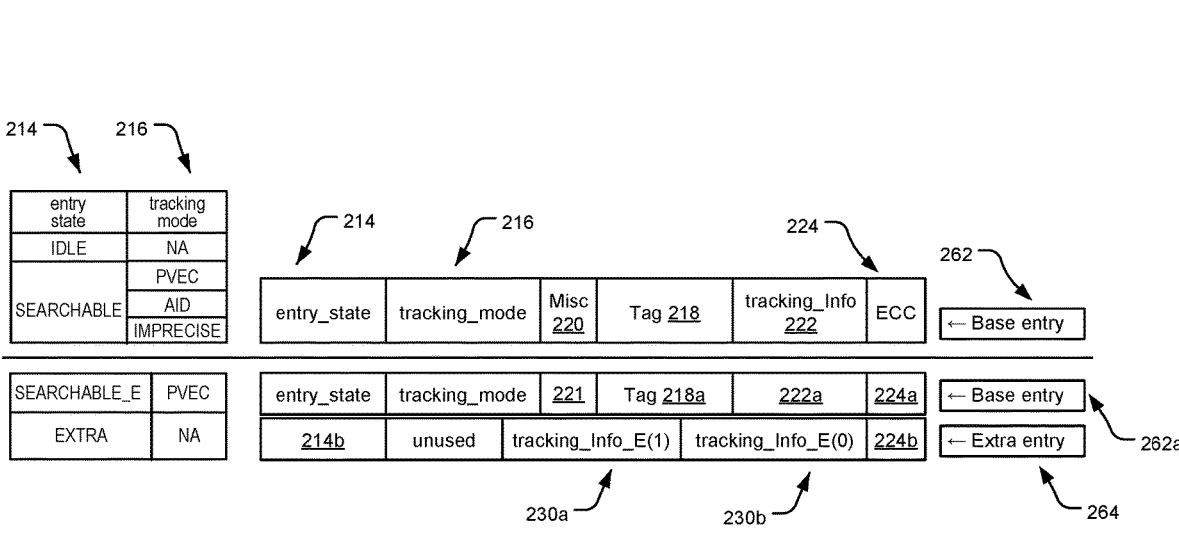
FIG. 2 illustrates an example structure of a snoop filter entry implementing the technology disclosed herein.

The detailed structure of the base SFT entries 162 and 162a, and the extra SFT entry 164 are illustrated in further detail below in FIG. 2. Specifically, FIG. 2 illustrates a structure of a logical snoop filter entry 200 implementing the technology disclosed herein. Specifically, the logical snoop filter entry 200 may be configured to hold n agent IDs (AIDs) or a partial vector (PVEC) in a base SFT entry 262. The logical snoop filter entry 200 may be configured to dynamically allocate an extra SFT entry 264 in an SFT set for the cases where a PVEC in the base entry 262 is not able to track all agents that have obtained a copy of the cogran.

FIG. 2 illustrates various components of the base SFT entry 262, when operating as a single entry without an extra entry and base SFT entry 262a when it is operating with the extra SFT entry 264. The base SFT entry 262 may include an entry_state field 214 that may be set to either IDLE or SEARCHABLE. A tracking_mode field 216 may be one of NA (if entry_state=IDLE), PVEC, AID, or IMPRECISE. Additionally, the base SFT entry 262 may include a Tag field 218 and a Misc field 220. A tracking_info field 222 where the base SFT entry records who is currently caching or thought to be caching the entry's cogran and an ECC field 224 may store error correction code bits.

The base SFT entry 262a may include a Tag field 218a and an extra_entry field 221. A tracking_info field 222a may include a portion of the base SFT entry's tracking vector and an ECC field 224a may store error correction code bits. The extra_entry field 221 indicates which other SFT physical entry has been assigned to be the extra entry for the logical SFT entry to which a base SFT entry 262a belongs if that logical SFT entry 200 has an extra entry. In one implementation, the extra_entry field 221 is present, even when the logical SFT entry 200 has no associated extra entry. In an alternative implementation, the extra_entry field 221 does not exist when the implementation of the logical SFT entry 200 hard codes for each physical base SFT entry, which other physical entry has been pre-assigned to be that physical base SFT entry's extra entry when the logical SFT entry 200's state indicates that it has an extra entry. It may be determined that a logical SFT entry 200 has an extra entry when its entry_state 214 is set to SEARCHABLE_E.

The extra SFT entry 264 may have its entry_state field 214b set to EXTRA and its tracking_mode field is (not applicable) NA. A tracking_info_E(1) field 230a and a tracking_info_E(0) field 230b of the extra SFT entry 264 may be used to store additional PVECs. An ECC field 224b may store error correction code bits. Thus, the logical SFT entry 200 is either (a) just the base SFT entry 262 when it has no associated extra SFT entry or (b) a combination of the base SFT entry 262a and its associated extra SFT entry 264.

Figure 3:
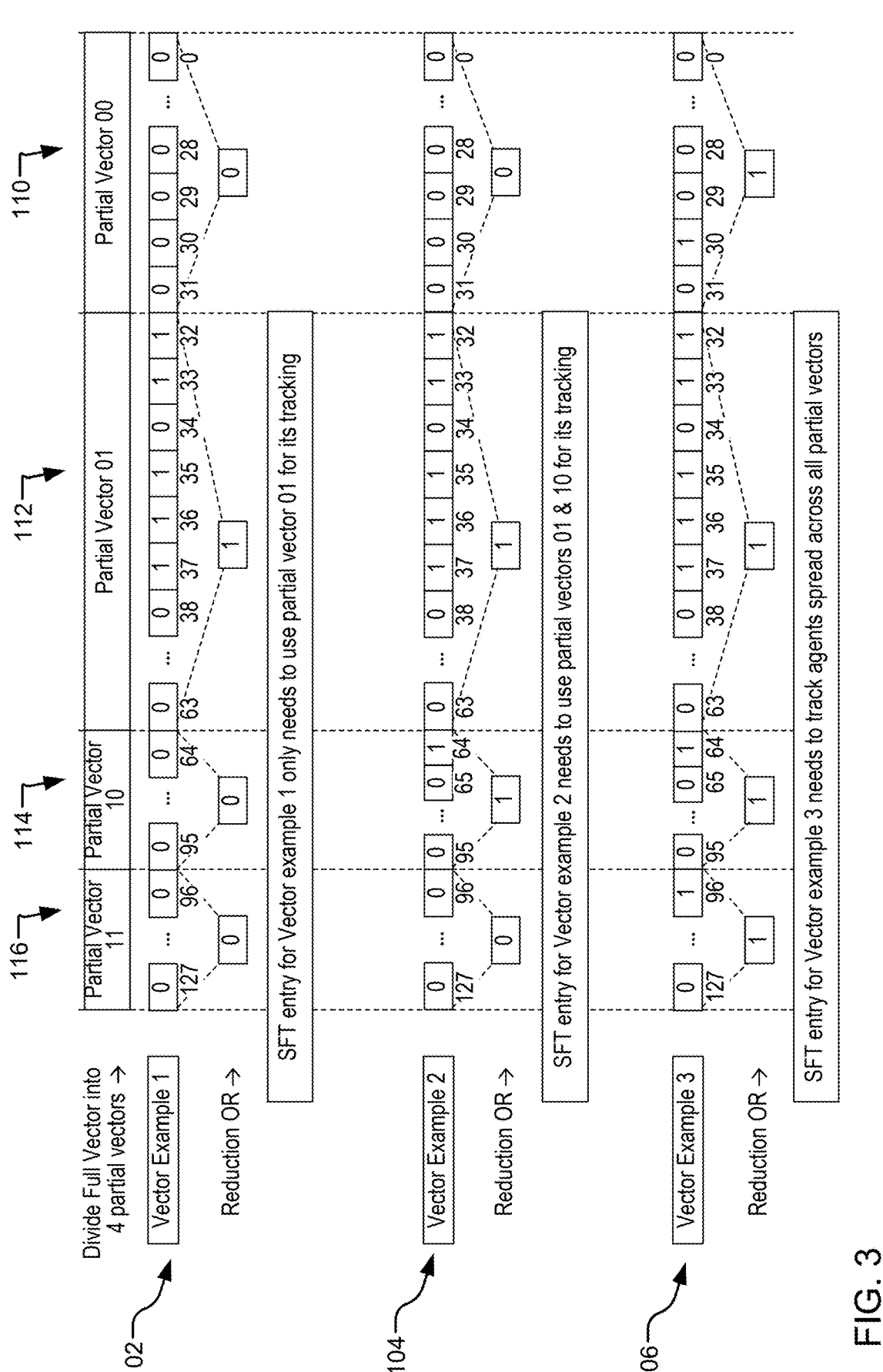
FIG. 3 illustrates an example a representation of a full tracking vector of the cache coherence system disclosed herein.

FIG. 3 illustrates a representation 300 of a full tracking vector where each bit of the full tracking vector indicates cache validity state of a coherence granule (cogran) in agent cache for a related agent into a number of partial vectors (PVECs). When the cache coherence system determines that it needs to change an SFT entry's tracking_mode from AID to something else or if the SFT entry's tracking_mode is currently PVEC, the SFT creates the equivalent full 128b tracking vector for that entry by decoding AIDs or steering partial vector(s) to the correct positions within the full tracking vector. Subsequently, the full vector is divided into its component PVECs. Next, the cache coherence system performs a reduction-OR across the bits of each partial vector to determine which PVECs the entry needs to record. If the result of the reduction-OR for a PVEC is zero, then there is no need to record that PVEC in the SFT entry for the cogran. If only one PVEC is needed, the one PVEC is stored in the tracking_info field of the base SFT entry. If more than one PVEC is needed, the SFT entry needs to employ an extra SFT entry. However, if all four PVECs are needed, the tracking_mode is changed to IMPRECISE.

Specifically, 302 represents a vector example 1 where a full vector is divided into four PVECs, namely PVEC 00 310, PVEC 01 312, PVEC 10 314, and PVEC 11 316. Specifically, the full vector may be a 128-bit vector that tracks 128 agents. Therefore, each of the PVECs 310-316 is a 32-bit partial vector. For the example 1 302, the given SFT entry's cogran has five sharer agents and each of them fall into the PVEC 01 312. Therefore, the reduction OR operation across the bits of the PVEC 01 312 returns a value of "1" whereas the reduction OR operation across the bits of the other PVECs returns a value of "0." In this case, a single SFT entry with a tracking_mode of PVEC is used to precisely track all the sharing agents for that cogran without needing to use an extra entry.

For the vector example 2 304, the SFT entry's cogran has 6 sharer agents who are spread across two PVECs, namely the PVEC 01 312 and the PVEC 10 314. In this case, the logical SFT entry requires an extra entry, sets the tracking_mode of the extra entry to PVEC, and records one PVEC in the tracking_info field of the base SFT entry and the other PVEC in the tracking_info field of the extra entry. Similarly, if three of the PVECs 310-316 had a sharer agent, two PVECs may be stored in the tracking_info field of the extra entry. For the vector example 3 306, the SFT entry's cogran has 8 sharer agents who are spread across all four PVECs 310-316. In this case, the logical SFT entry needs to hold the full tracking vector but doesn't have the capacity to do so. Therefore, it sets its tracking_mode to IMPRECISE.

Figure 4:
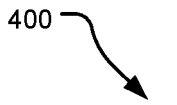
FIG. 4 illustrates example entry states for the logical SFT entry of the cache coherence system disclosed herein.
Figure 4:
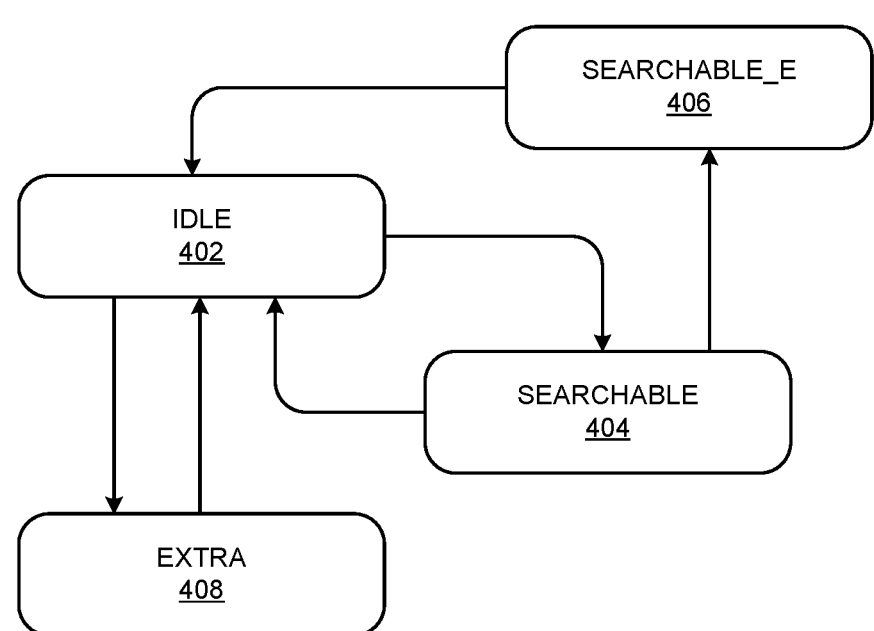

FIG. 4 illustrates example entry states 400 for the logical SFT entry of the cache coherence system disclosed herein. Specifically, the logical SFT entry's entry_state field may be set to four different values, namely IDLE, SEARCHABLE, SEARCHABLE_E, and EXTRA based on the state of the logical SFT entry. When the entry state of the logical SFT entry is IDLE 402, a physical SFT entry is available to be used to allocate a new cogran as an SFT base entry and a physical entry is available to be used as an extra SFT entry for a logical SFT entry. When a base SFT entry is allocated to start tracking a cogran for the first time, the base entry's entry_state is set to SEARCHABLE 404. The base SFT entry's entry_state may be updated as more agents add or evict the base SFT entry's cogran from their cache. If at any time the agents caching the cogran exceeds the base SFT entry's ability to track precisely, the base SFT entry either obtains an extra SFT entry and changes its entry_state to SEARCHABLE_E 406 or the base SFT entry changes to an imprecise mode for the agents it's tracking. When the SFT no longer needs to track a cogran, the SFT base entry's entry_state for that cogran is set to IDLE 402.

When an SFT entry is available (i.e., with entry_state=IDLE) the available SFT entry may be put into service as an extra SFT entry for a logical SFT entry. In that case, that available SFT entry's entry_state is set to EXTRA 408. When a logical SFT entry no longer needs to employ an extra SFT entry for a cogran or the SFT evicts the cogran from its tracking, any associated extra SFT entry's entry_state is set to IDLE 402.

When a physical SFT entry's entry_state is SEARCHABLE 404, that physical SFT entry contains information that can be used to determine whether the SFT holds a cogran, and it is not available to allocate a new cogran nor to be an extra entry for some logical SFT entry. In this case the logical SFT entry does not have an associated extra SFT entry. When a physical SFT entry's entry_state is SEARCHABLE_E 406, that physical SFT entry contains information that can be used to determine whether the SFT holds a cogran, and it is not available to allocate a new cogran nor to be an extra entry for some logical SFT entry. However, in this case the logical SFT entry has an associated extra SFT entry. When a physical SFT entry's entry_state is EXTRA 408, that physical entry is an extra SFT entry that contains some or all tracking information on behalf of is associated base SFT entry and it is not available to allocate a new cogran nor to be an extra SFT entry for some base SFT entry.

Figure 5:
FIG. 5 illustrates example tracking modes for the logical SFT entry of the cache coherence system disclosed herein.
Figure 5:
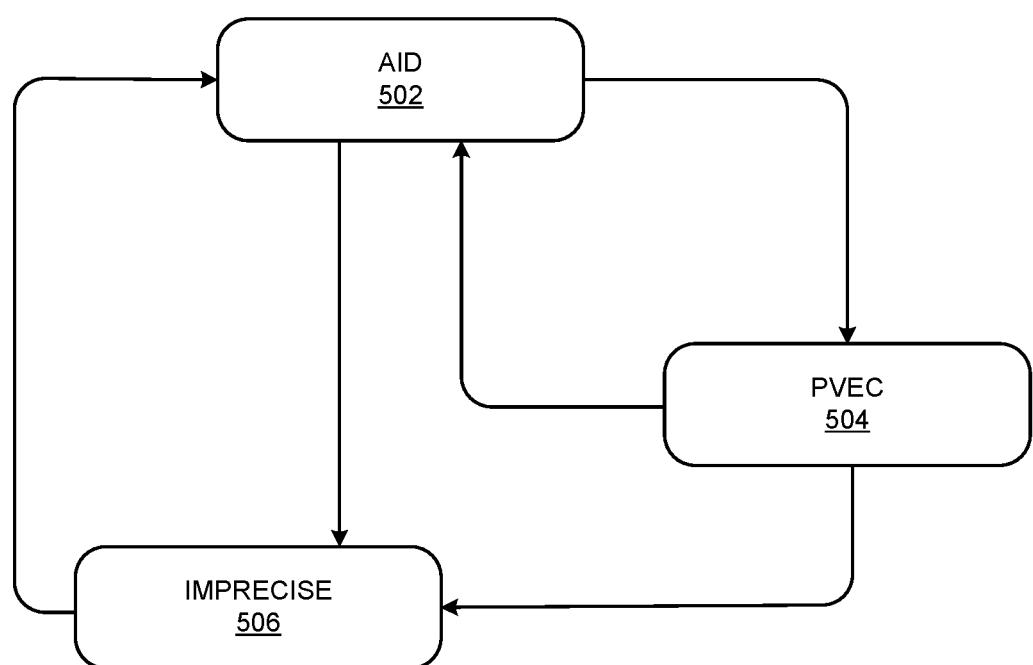

FIG. 5 illustrates example tracking modes 500 for the logical SFT entry of the cache coherence system disclosed herein. At the time of its allocation an SFT entry starts in AID (502) mode and if the SFT entry later exhausts its ability to add new AIDs to it tracking, it switches to either PVEC (504) mode or to IMPRECISE (506) mode. When a logical SFT entry's tracking_mode=AID, its tracking_info contains the AIDs for one or more agents that have cached the cogran that the logical SFT entry is tracking. When a logical SFT entry's tracking_mode=PVEC, its tracking_info contains one or more partial vectors (PVECs) that indicate which agents have cached the cogran that the logical SFT entry is tracking. When a logical SFT entry's tracking_mode=IMPRECISE, its tracking_info isn't completely sure which agents have cached the cogran that the SFT entry is tracking. This typically leads to some amount of oversnooping while maintaining cache coherence.

Table I below illustrates various combinations of entry_state and tracking_mode to determine how to interpret the information held by the logical SFT entry's tracking_info field(s):

TABLE I

| Entry_State | Tracking_Mode | Extra entry exists? | Tracking_info field(s) |
|---|---|---|---|
| IDLE | NA | NA | Entry not in use |
| SEARCHABLE | AID | No | Agent IDs (AIDs) in base entry only |
| | PVEC | No | Partial Vector in base entry only |
| | IMPRECISE | No | Imprecise tracking; base entry only |
| SEARCHABLE_E | AID | Yes | NA |
| | PVEC | Yes | Multiple partial vector(s) spread across base and extra entries |
| | IMPRECISE | Yes | NA |

Figure 6:
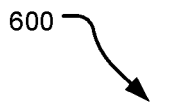
FIG. 6 illustrates example values of a tracking_info field for a base SFT entry of the cache coherence system disclosed herein.
Figure 6:
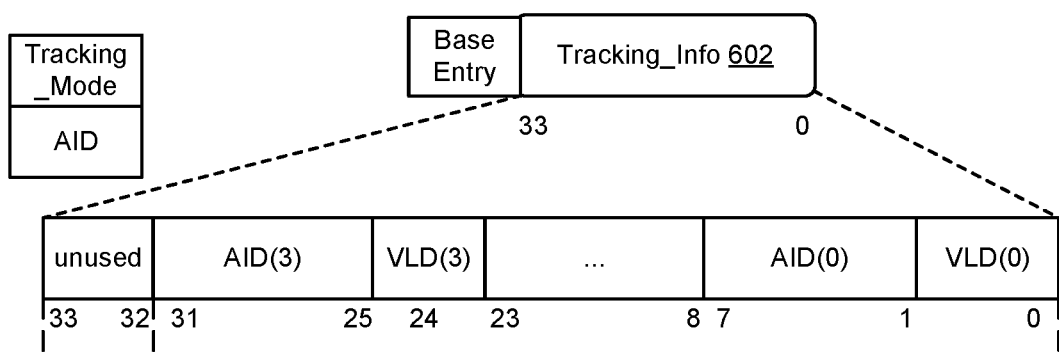

FIG. 6 illustrates example values of a tracking_info field 602 for the base SFT entry 600 of the cache coherence system disclosed herein when the tracking_mode of the SFT entry is equal to AID. The tracking_info field 602 may store tracking information regarding the AIDs being tracked by the SFT entry. Specifically, in an AID mode, the width of the tracking_info field 602 may include 4 AIDs, AID(0)-AID(3), with a width of 8b each, including 7b to identify the AID and 1b to indicate whether the AID is currently valid, VLD(0)-VLD(3).

Figure 7:
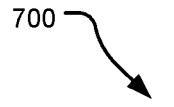
FIG. 7 illustrates example values of a tracking_info field for the base SFT entry of the cache coherence system disclosed herein.
Figure 7:
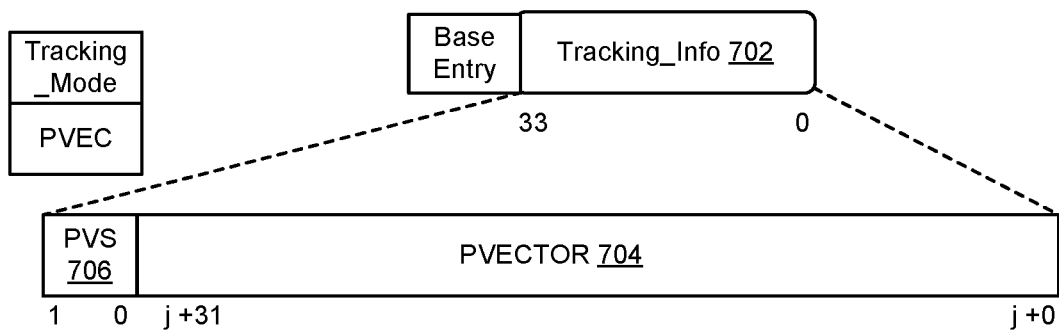

FIG. 7 illustrates example values of a tracking_info field 702 for the base SFT entry 700 of the cache coherence system disclosed herein when the tracking_mode of the SFT entry is equal to PVEC and the entry state is set to either SEARCHABLE or SEARCHABLE_E. In the illustrated example, the 128b precise tracking vector is split into four PVECs. When the SFT entry's tracking_mode is set to PVEC, the base SFT entry 700 contains a single PVEC that's held by the tracking_info field 702's PVECTOR subfield 704. Additionally, the tracking_info's PVS (partial vector select) field 706 indicates which PVEC is recorded: 1st, 2nd, 3rd, or 4th. When the SFT entry's entry_state is set to SEARCHABLE_E, the logical SFT entry also has an extra SFT entry to record additional PVECs. The tracking_info's PVS field 706 is also referred to herein as the PVEC pointer as it indicates which PVEC is recorded.

Figure 8:
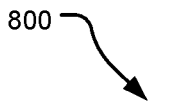
FIG. 8 illustrates example values of a tracking_info field for the extra SFT entry of the cache coherence system disclosed herein.
Figure 8:
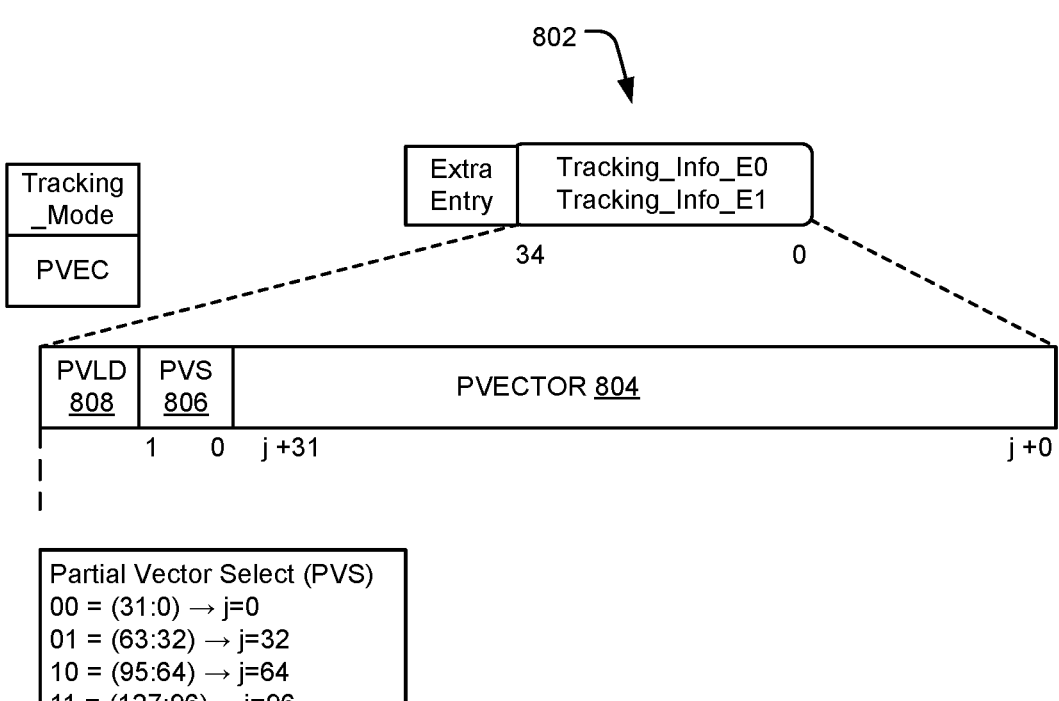

FIG. 8 illustrates example values of a tracking_info field 802 for the extra SFT entry 800 of the cache coherence system disclosed herein when the tracking_mode of the SFT entry is equal to PVEC and the entry_state is set to SEARCHABLE_E. In the illustrated example, the 128b precise tracking vector is split into four PVECs. When the SFT entry's tracking_mode is set to PVEC and the SFT entry's entry_state is SEARCHABLE_E, the SFT entry 800 is an extra SFT entry and contains additional PVECs that its base SFT entry does not have capacity to hold. The first PVEC is held by the base SFT entry's tracking_info field. The second PVEC is held by one of the extra SFT entry's tracking_info_E fields, for example, in tracking_info_E0. Each tracking_info_E fields has three subfields: PVECTOR 804, the partial vector held by the field, PVS 806, also referred to as the PVEC pointer 806, to indicate which partial vector is held by the PVECTOR field 804, and PVLD 808 to indicate whether the tracking_info_E field is in use. If a third PVEC is in use by the SFT entry, it's held in the remaining tracking_info_E field.

When an SFT entry is established so that it may being tracking who has cached a cogran, the SFT selects an available SFT entry. The SFT sets the selected SFT entry's entry_state to SEARCHABLE and sets the selected SFT entry's tracking_mode to AID. Subsequently, the SFT forms the agent's AID by determining which full tracking vector bit has been designated to signify that agent and then encoding that bit to a 7b value. Note that 7 bits are needed to uniquely identify one of the 128 agents that are tracked by the full vector in the example system described herein. The SFT records the AID in the AID(i) subfield of the selected SFT entry's tracking_info field and sets the associate VLD(i) subfield bit. Furthermore, the SFT entry's Tag and ECC fields may be written as appropriate.

Figure 9:
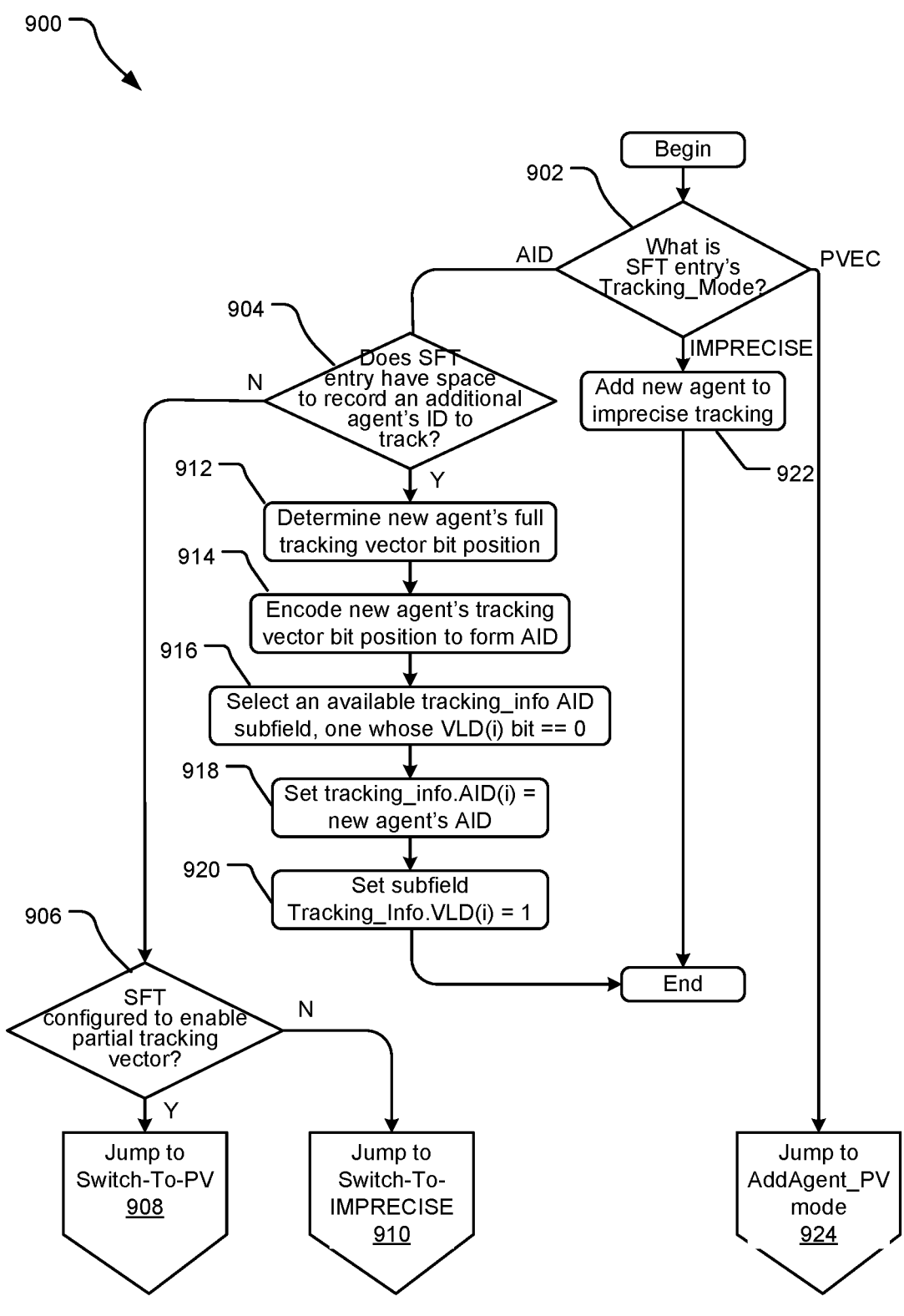
FIG. 9 illustrates example operations for a case when an agent newly caches a copy of a cogran that is currently being tracked by the SFT.

FIG. 9 illustrates operations 900 for a case when an agent newly caches a copy of a cogran that is currently being tracked by the SFT. An operation 902 determines the tracking_mode of the SFT entry that is tracking the cogran. If the SFT entry's tracking_mode is currently set to AID, an operation 904 determines if the SFT entry has space to record an additional AID to the tracking_info field. If no, an operation 906 determines if the SFT is configured to enable partial vector (PVEC). If so, at operation 908 the control is transferred to SWITCH_TO_PVEC operations further discussed below in FIG. 11. On the other hand, if the operation 906 determines that the SFT is not configured to enable partial vector (PVEC), at operation 910 control is transferred to IMPRECISE operations further discussed below in FIG. 10.

If the operation 904 determines that the SFT entry has space to record an additional AID to the tracking_info field, an operation 912 determines the new agent's full tracking vector bit position. An operation 914 encodes the new agent's tracking vector bit position into a 7b value to form the AID, an operation 916 selects an available AID subfield in the entry's tracking_info field, an operation 918 records the new agent's AID in the selected AID subfield, and an operation 920 sets the VLD subfield for the selected AID subfield to 1.

If operation 902 determines that the tracking_mode of the SFT entry that is tracking the cogran is set to IMPRECISE an operation 922 adds the agent to the entry's imprecise tracking as needed. On the other hand, if operation 902 determines that the tracking_mode of the SFT entry that is tracking the cogran is set to PVEC, an operation 924 transfers the control to AddAgent_PVmode further disclosed below in FIG. 13.

Figure 10:
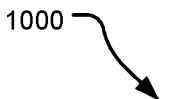
FIG. 10 illustrates example operations for a case when an SFT entry determines that it's unable to precisely track which agents have cached a cogran that the SFT is tracking.
Figure 10:
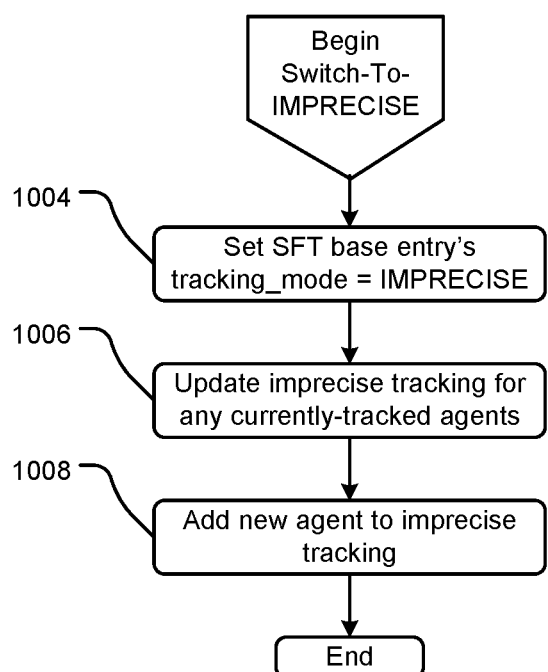

FIG. 10 illustrates operations 1000 for a case when an SFT entry determines that it's unable to precisely track which agents have cached a cogran that the SFT is tracking. An operation 1004 sets the base SFT entry's tracking_mode to IMPRECISE, an operation 1006 updates the base SFT entry's tracking_info appropriately for imprecise tracking of any currently tracked agents, and an operation 1008 adds the new agent to the base SFT entry's imprecise tracking_info field.

Figure 11:
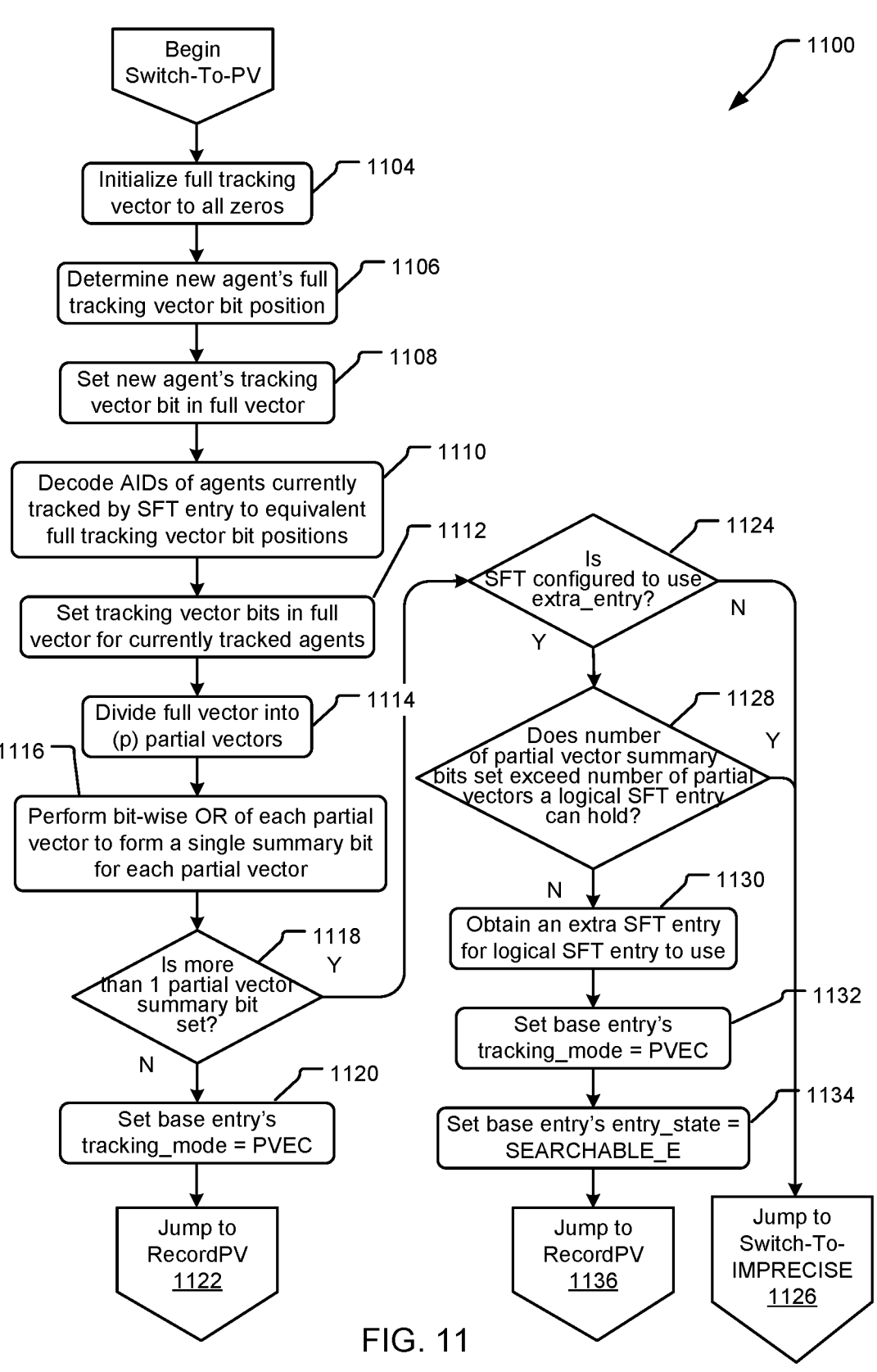
FIG. 11 illustrates example operations for a case when an SFT entry wants to attempt to change its tracking_mode to PVEC while it's adding a new agent to its tracking for a cogran.

FIG. 11 illustrates operations 1100 for a case when an SFT entry wants to attempt to change its tracking_mode to PVEC while it's adding a new agent to its tracking for a cogran. An operation 1104 initializes a full tracking vector to all bits set to zeros, an operation 1106 determines the new agent's full tracking vector bit position, and an operation 1108 sets the new agent's bit in the full tracking vector. An operation 1110 decodes the AID of each agent currently tracked by the SFT entry to the equivalent full tracking vector bit position for each AID held in the entry's tracking_info field, and operation 1112 sets the vector bits in the full tracking vector for currently tracked agents, and an operation 1114 divides the full tracking vector into several equally sized partial vectors, for example, in the exemplary embodiment, there are four partial vectors. Subsequently, an operation 1116 performs a reduction-OR across all the bits of each PVEC to form a single summary bit per PVEC (referred to as PVEC summary bit).

An operation 1118 determines if more than one PVEC summary bits are set. If only one PVEC summary bit is set (indicating that all agents that have cached the SFT entry's cogran fall within a single PVEC), an operation 1120 sets the base SFT entry's tracking_mode to PVEC and at 1122, the control is transferred to the RecordPV operations disclosed below in FIG. 12. If operation 1118 determines that more than one PVEC summary bit is set (indicating that all agents that have cached the SFT entry's cogran are spread beyond a single PVEC), an operation 1124 determines if the SFT is configured to use an extra SFT entry. If the SFT is not configured to use an extra SFT entry, at operation 1126 the control transfers to Switch-to-IMPRECISE operations disclosed above in FIG. 10.

If the operation 1124 determines that the SFT is configured to use an extra SFT entry, an operation 1128 determines whether the number of non-zero PVECs (i.e., one whose PVEC summary bit is set) exceeds a logical SFT entry's ability to hold that number of partial vectors. For example, if an SFT base entry can hold a single partial vector and an SFT extra entry can hold up to two partial vectors, then a single logical SFT entry can hold up to three partial vectors. If the operation 1128 determines that the number of non-zero PVECs exceeds a logical SFT entry's ability to record that number of PVECs, the control transfers to Switch-To-IMPRECISE operations disclosed above in FIG. 10.

However, if the operation 1128 determines that the number of non-zero PVECs does not exceed a logical SFT entry's ability to record that number of PVECs, an operation 1130 obtains an extra entry, an operation 1132 changes the base SFT entry's tracking_mode to PVEC, and an operation 1134 changes the base SFT entry's entry_state to SEARCH-ABLE_E. Subsequently, at operation 1136, control transfers to RecordPV operations further disclosed below in FIG. 12.

Figure 12:
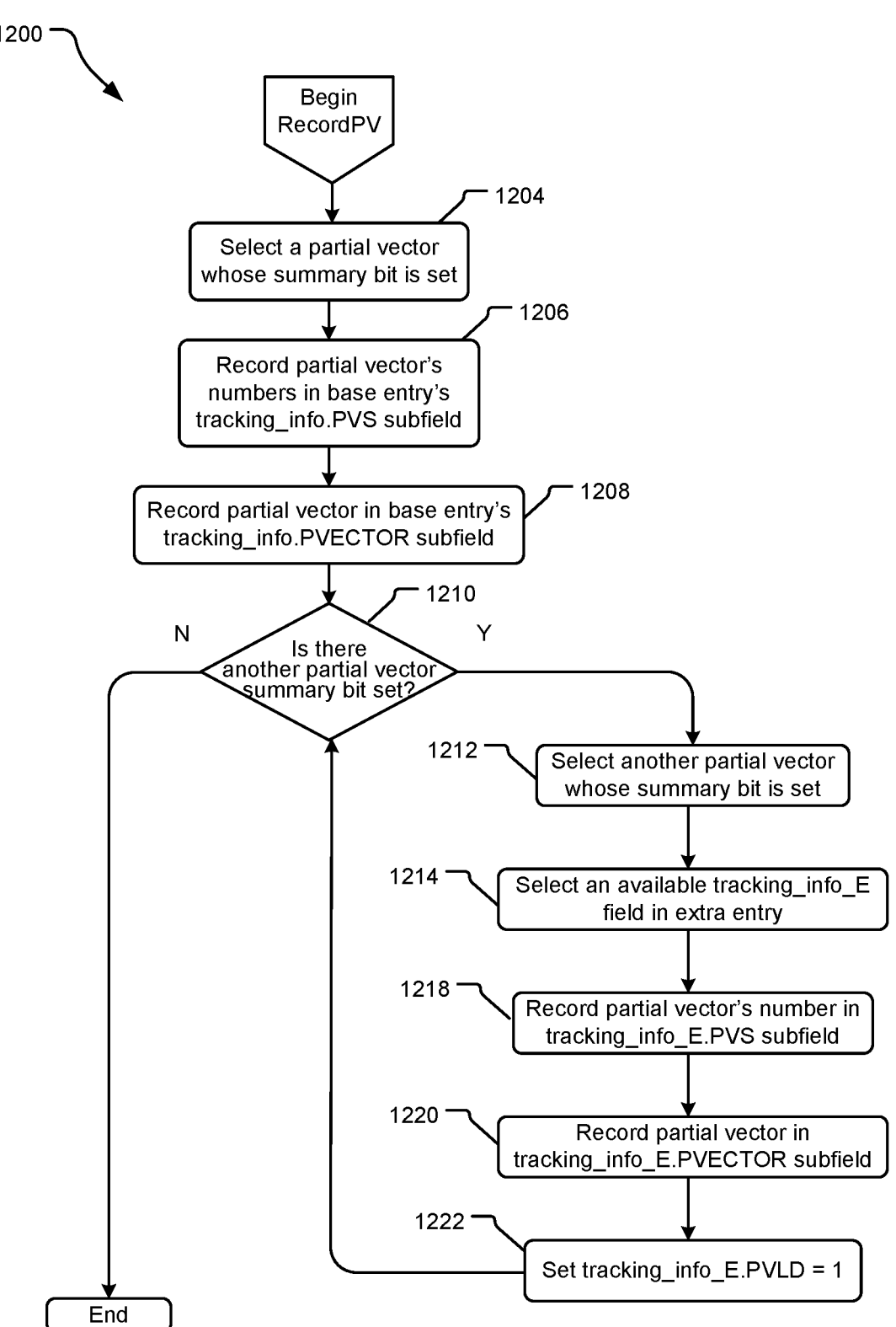
FIG. 12 illustrates example operations for recording one or more PVECs into the SFT.

FIG. 12 illustrates operations 1200 for a case when the SFT updates an SFT entry due to either adding an agent to or removing an agent from the SFT entry's tracking_info and the SFT entry's tracking_mode is PVEC. The operations 1200 records one or more PVECs to the SFT entry. Starting with the full tracking vector for the SFT entry, an operation 1204 selects a PVEC whose PVEC summary bit is set. Operation 1206 records the PVEC's number in the base entry's tracking_info.PVS subfield (such as the PVS, or PVEC pointer, 706 disclosed in FIG. 7) and an operation 1208 records the PVEC in the base entry's tracking_info.PVECTOR subfield (such as the PVECTOR 704 disclosed in FIG. 7).

An operation 1210 determines whether there are any other PVECs whose PVEC summary bit is set. If there are no such PVECs, the operation 1200 ends. If there are additional PVECs whose PVEC summary bit is set, an operation 1212 selects another PVEC whose PVEC summary bit is set, an operation 1214 selects an available tracking_info_E field in the extra SFT entry (such as the tracking_info_E0 field 802 disclosed above in FIG. 8), an operation 1218 records the PVEC's number in the tracking_info_E.PVS subfield (such as the PVS, or PVEC pointer, 806 disclosed in FIG. 8), and an operation 1220 records the PVEC in the tracking_info_E.PVECTOR subfield of the extra SET entry (such as the PVECTOR 804 disclosed in FIG. 8). Subsequently, an operation 1222 sets the tracking_info_E.PVLD subfield bit to 1 (such as the tracking_info_E.PVLD subfield 808 disclosed in FIG. 8) and the control loops back to the determining operation 1210 to check whether there is another PVEC that needs to be recorded.

Figure 13:
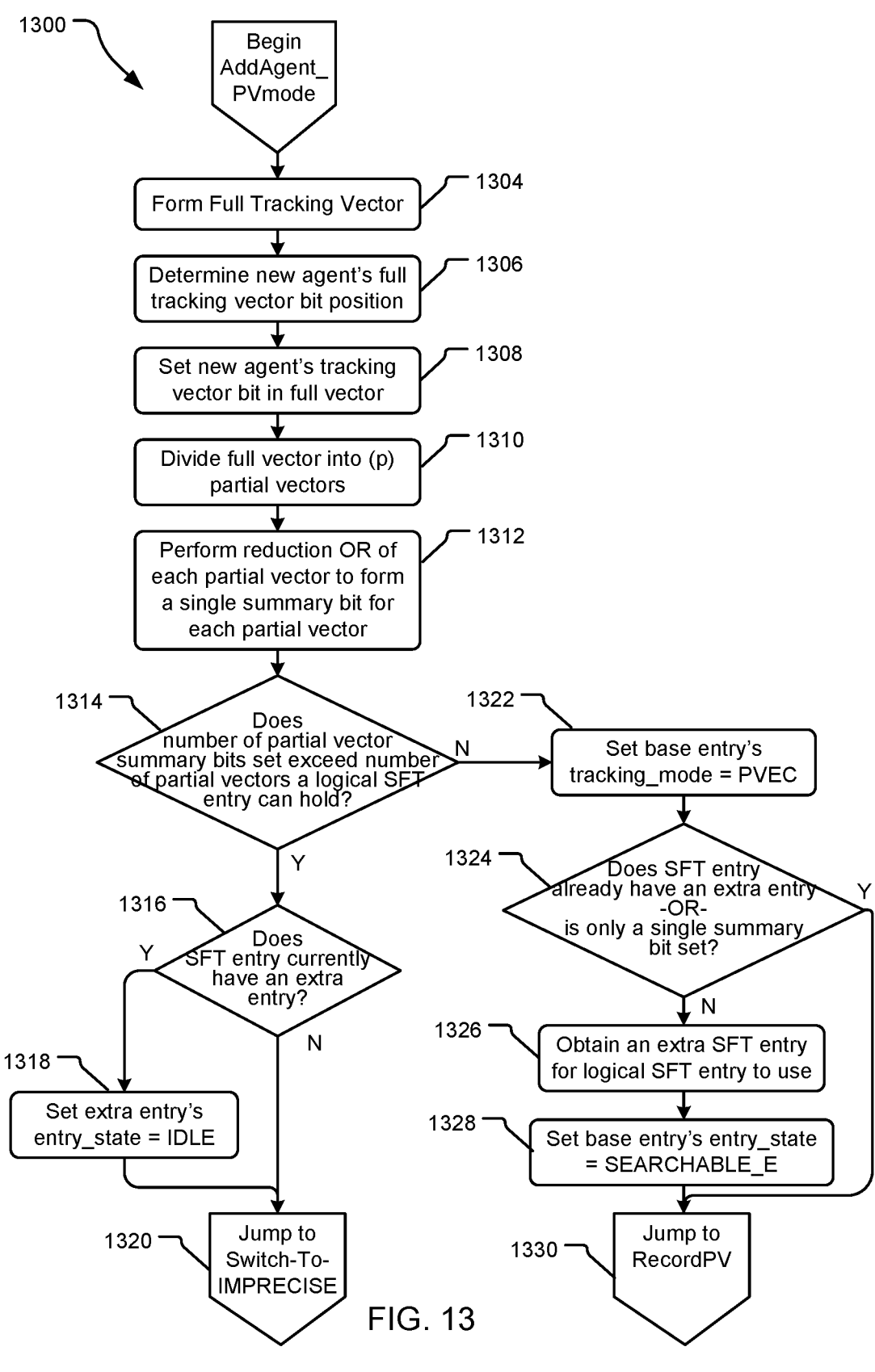
FIG. 13 illustrates example operations for a case when an SFT entry's tracking_mode is PVEC and the SFT needs to add an agent to its tracking for that SFT entry.

FIG. 13 illustrates operations 1300 for a case when an SFT entry's tracking_mode is PVEC and the SFT needs to add an agent to its tracking for that SFT entry. An operation 1304 forms a full tracking vector, an operation 1306 determines the new agent's full tracking vector bit position, and an operation 1308 sets the new agent's tracking vector bit in the full tracking vector. An operation 1310 divides the full tracking vector into p PVECs. For example, in the illustrated implementation, p=4. An operation 1312 performs a reduction-OR of PVEC to form a single summary bit (PVEC summary bit) for each PVEC, where the summary bit indicates whether any bit of the PVEC is set.

An operation 1314 determines whether the number of PVEC summary bits set exceeds the logical SFT entry's ability to hold that number of PVECs. If so, an operation 1316 determines if the logical SFT entry has an extra SFT entry. If so, an operation 1318 sets the extra SFT entry's entry_state to IDLE. At operation 1320 control is transferred to Switch-To-IMPRECISE operations disclosed above in FIG. 10.

If operation 1314 determines that the number of PVEC summary bits set do not exceed the logical SFT entry's ability to hold that number of PVECs, an operation 1322 sets the base SFT entry's tracking_mode to PVEC. Subsequently, an operation 1324 determines if the logical SFT entry already has an extra SFT entry or if there is only a single PVEC summary bit set. If so, the control transfers at operation 1330 to RecordPV operations disclosed above in FIG. 12. If the operation 1324 determines that the SFT entry does not yet have an extra SFT entry and if there is more than one PVEC summary bit set, an operation 1326 obtains an extra entry for the logical SFT entry to use, an operation 1328 changes the base entry's entry_state to SEARCH-ABLE_E, and control transfers at operation 1330 to RecordPV operations disclosed above in FIG. 12.

Figure 14:
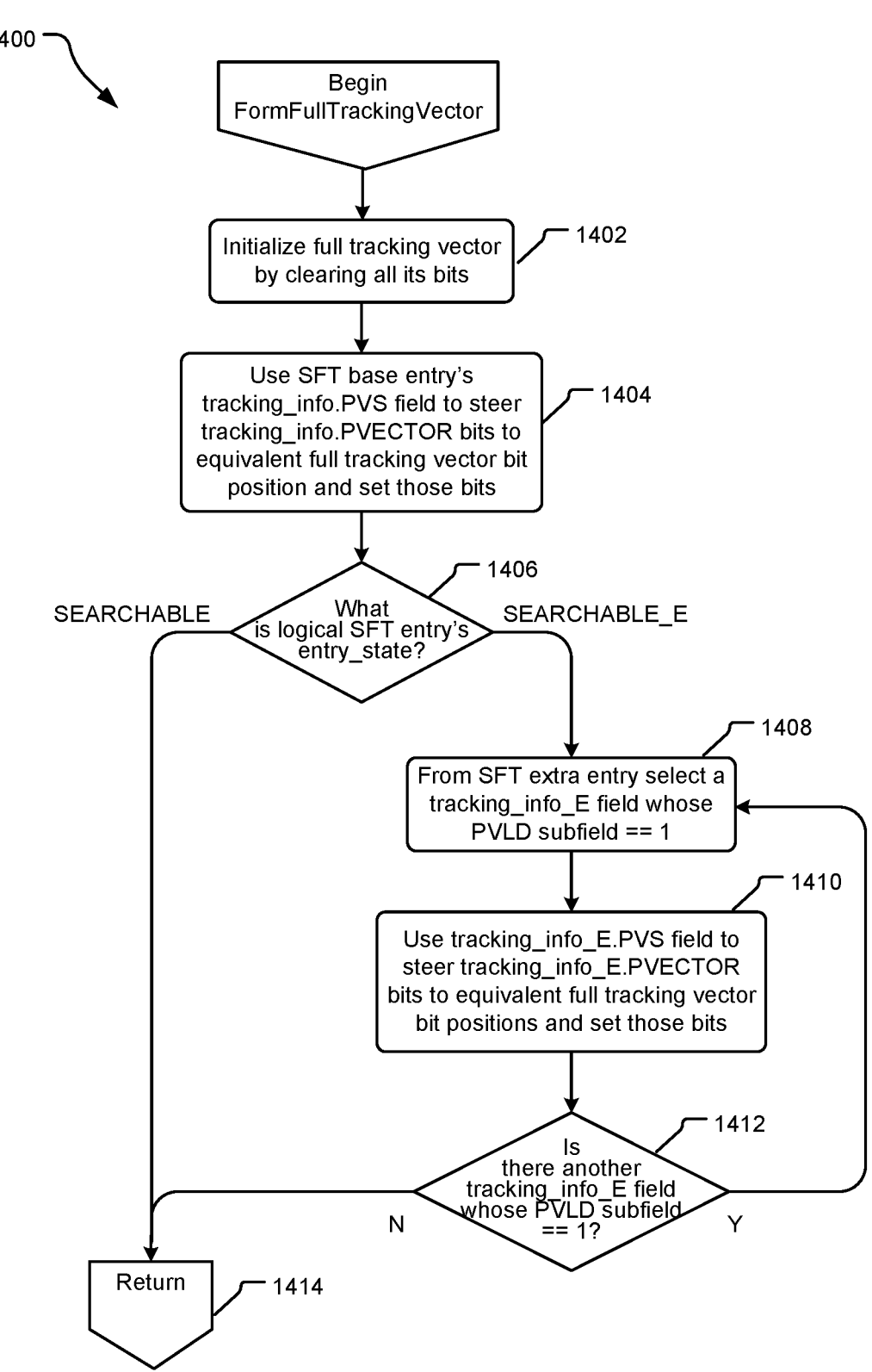
FIG. 14 illustrates example operations to form the full tracking vector for the SFT entry when the SFT updates an SFT entry.

FIG. 14 illustrates operations 1400 to form the full tracking vector for the SFT entry when the SFT updates an SFT entry due to either adding an agent to or removing an agent from the SFT entry's tracking_info and the SFT entry's tracking_mode is PVEC. The operations 1400 may be performed when an SFT entry's tracking_mode is set to PVEC and the SFT needs to form the full tracking vector for the SFT entry because it needs to add an agent to the SFT entry's agent tracking, it needs to remove an agent from the SFT entry's agent tracking, or it needs to send a snoop.

An operation 1402 initializes the full tracking vector by clearing all its bits and an operation 1404 uses the SFT base entry's tracking_info.PVS subfield to steer the bits of the partial vector contained in the tracking_info.PVECTOR subfield to their equivalent bit positions in the full tracking vector and sets those bits in the full tracking vector. An operation 1406 determines the entry_state of the logical SFT entry. If the SFT entry's entry_state is SEARCHABLE indicating it does not have extra entry, the operations 1400 terminate.

If the SFT entry's entry_state is SEARCHABLE_E, an operation 1408 selects, from the logical SFT entry's extra entry, a tracking_info_E field whose PVLD subfield is 1. An operation 1410 uses the tracking_info_E.PVS subfield to steer the bits of the PVEC contained in the tracking_info_E.PVECTOR subfield to their equivalent bit positions in the full tracking vector and set those bits in the full tracking vector. An operation 1412 determines if there is another tracking_info_E field whose PVLD subfield is set. If so, the control transfers back to operation 1408, otherwise the operations 1400 terminate.

Figure 15:
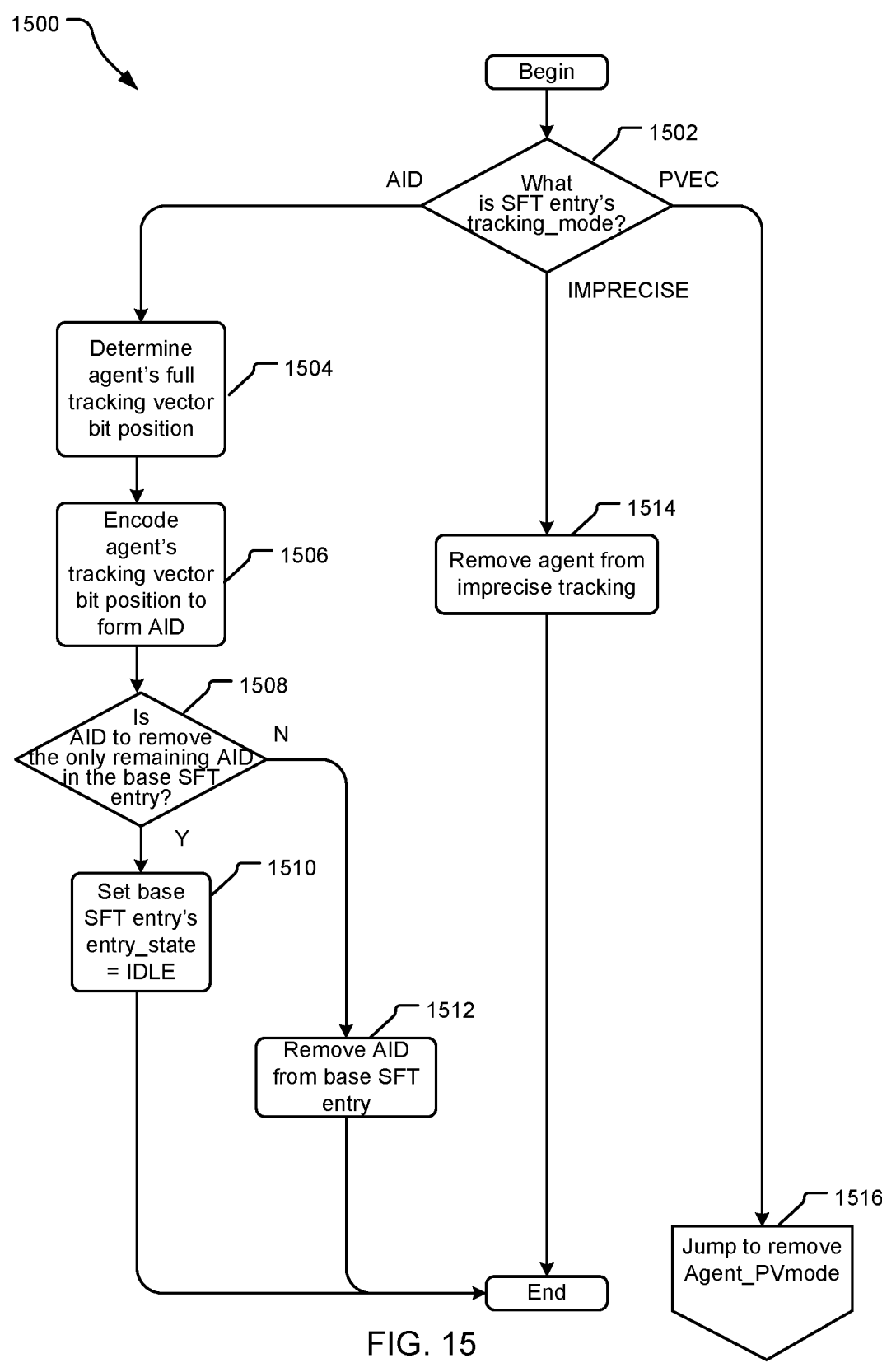
FIG. 15 illustrates example operations for a case when the SFT needs to update an existing logical SFT entry to remove an agent from its tracking.

FIG. 15 illustrates operations 1500 for a case when the SFT needs to update an existing logical SFT entry to remove an agent from its tracking, for example, when the agent is known to have given up its copy of the cogran. An operation 1502 determines the SFT entry's tracking_mode. If the tracking_mode is AID, an operation 1504 determines agent's full tracking vector bit position, an operation 1506 encodes the agent's tracking vector bit position to form its AID, and an operation 1508 determines if the base SFT entry only has a single valid AID remaining. If the AID to remove is the only remaining AID in the base SFT entry, an operation 1510 sets the base SFT entry's entry_state to IDLE. Otherwise, an operation 1512 remove the AID from the base SFT entry. Here, removing an AID means selecting the tracking_info's AID subfield whose value matches the agent's AID and clearing the corresponding VLD bit for that AID subfield.

If the operation 1502 determines that the SFT entry's tracking_mode is IMPRECISE, an operation 1514 removes the agent from the SFT's imprecise tracking as needed. If the operation 1502 determines that the SFT entry's tracking-_mode is PVEC, control transfers to removeAgent_PVmode operations disclosed below in FIG. 16.

Figure 16:
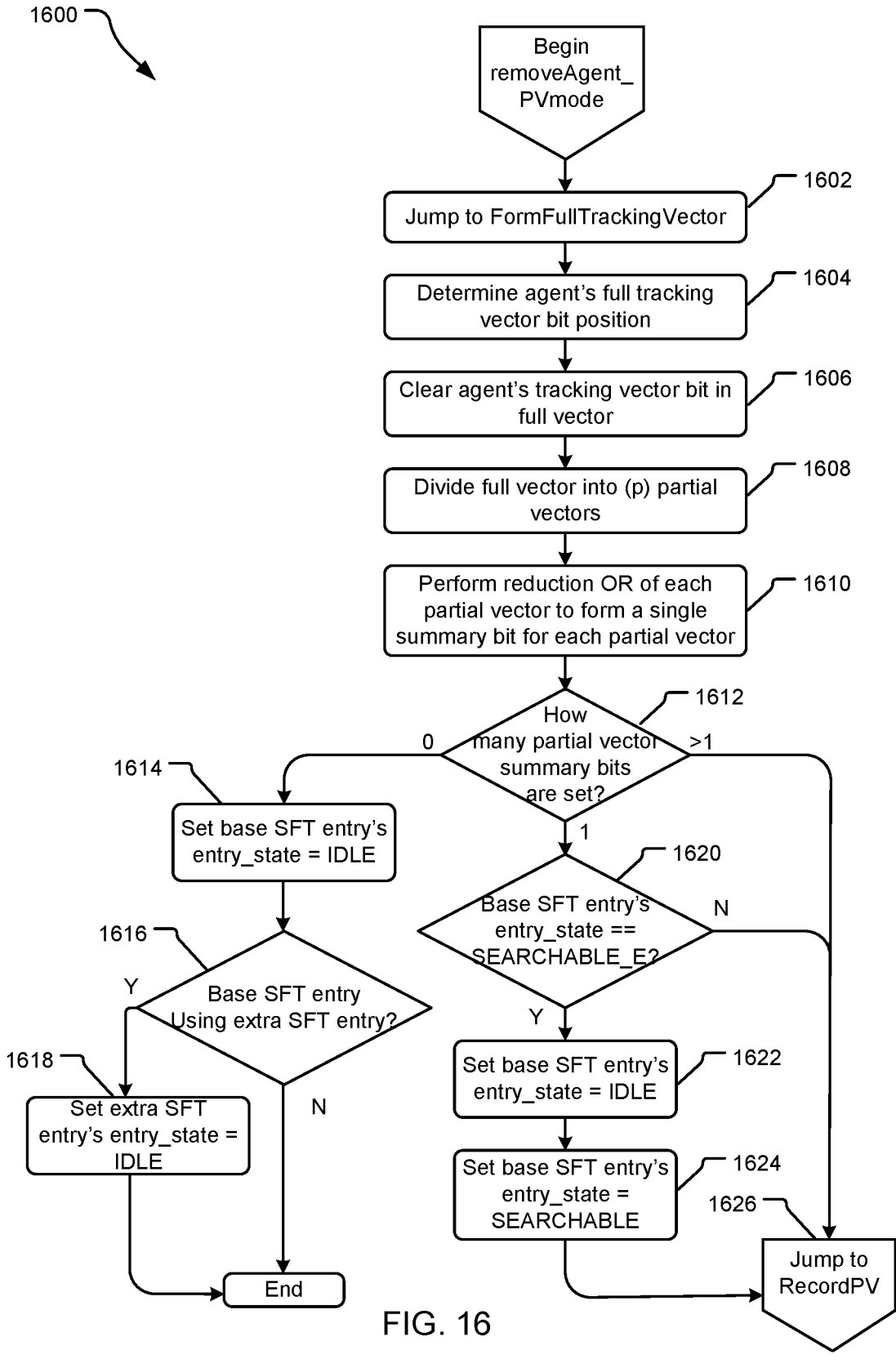
FIG. 16 illustrates example operations for a case when an SFT entry's tracking_mode is PVEC and the SFT needs to remove an agent from its tracking for that SFT entry.

FIG. 16 illustrates operations 1600 for a case when an SFT entry's tracking_mode is PVEC and the SFT needs to remove an agent from its tracking for that SFT entry. An operation 1602 forms a full tracking vector (such as disclosed above in FIG. 14), an operation 1604 determines the agent's bit position in the full tracking vector, and operation 1606 clears the agent's tracking vector bit in the full tracking vector, and an operation 1608 divides the full tracking vector into p PVECs. Subsequently, an operation 1610 performs a reduction-OR of each PVEC to form a single PVEC summary bit for each PVEC, where the PVEC summary bit indicates whether any bit of the PVEC is set.

An operation 1612 determines the number of PVEC summary bits that are set. If no partial vector summary bits are set, the SFT entry no longer needs to track the cogran, therefore an operation 1614 sets the base SFT entry's entry_state to IDLE. An operation 1616 determines if the base SFT entry is using an extra SFT entry. If so, an operation 1618 sets the entry_state of the extra SFT entry to IDLE.

If operation 1612 determines that the number of PVEC summary bits that are set is exactly one, an operation 1620 determines whether the base SFT entry's entry_state is SEARCHABLE_E. If not, the control is transferred to the RecordPV operations further disclosed in FIG. 12 above. However, if the base SFT entry's entry_state is SEARCH-ABLE_E, then the extra entry is no longer needed. In this case, an operation 1622 sets the entry_state of the extra SFT entry to IDLE, an operation 1624 sets the base SFT entry's entry_state to SEARCHABLE, and the control is transferred to the RecordPV operations further disclosed above in FIG. 12 above. The illustrated example has a single PVEC field in the base SFT entry, giving the PVEC summary bit a value of one. However, in alternative implementations where the PVEC are smaller, more than one PVEC may be recorded in the base SFT entry, in which case the above operations may use a different value of the PVEC summary bit to make one or more decisions.

On the other hand, if operation 1612 determines the number of PVEC summary bits that are set is >1, the control is transferred to the RecordPV operations further disclosed in FIG. 12 above.

Figure 17:
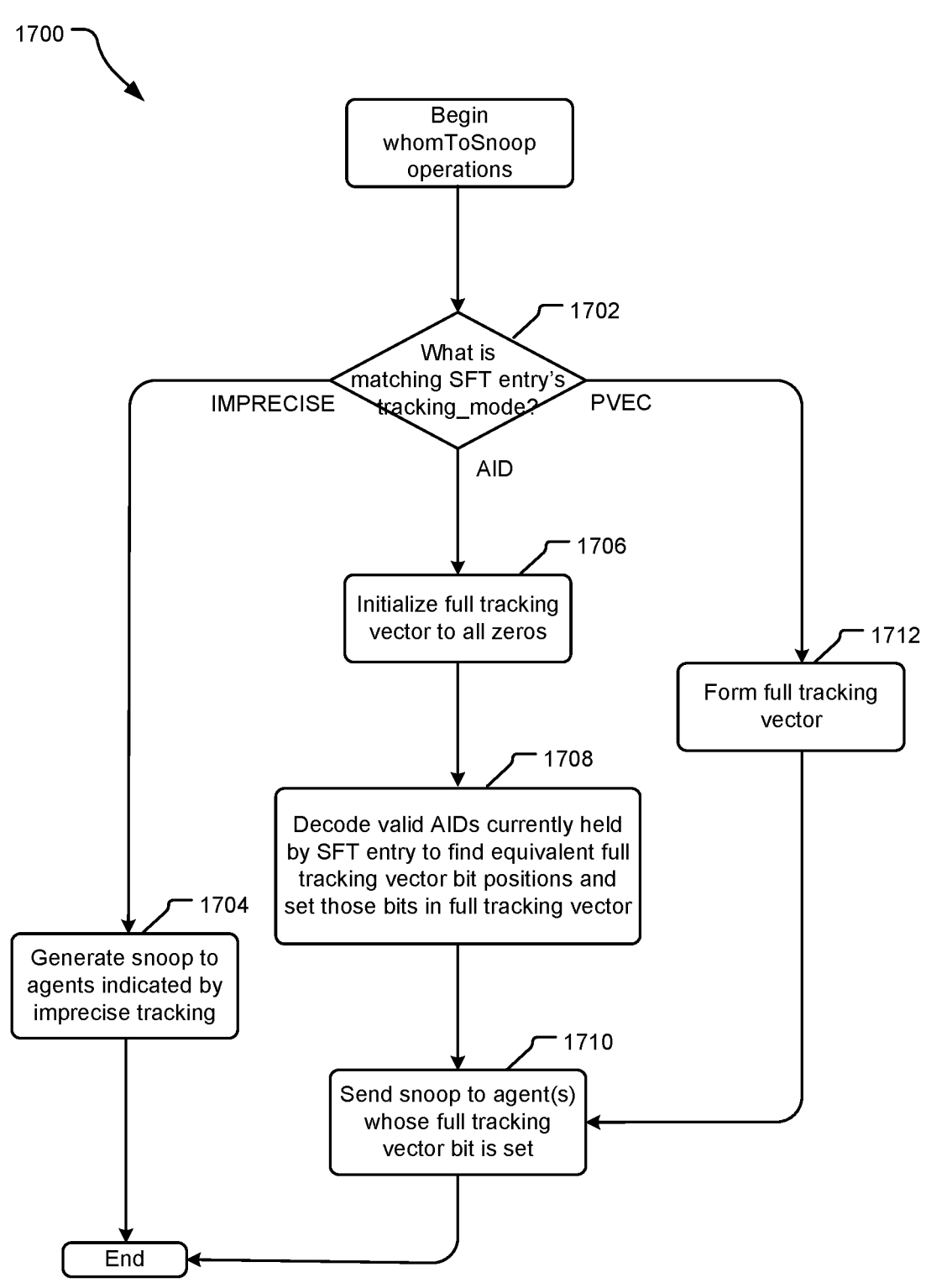
FIG. 17 illustrates example operations for a case when a cogran is accessed and an SFT lookup is performed to determine whether a snoop is needed.

FIG. 17 illustrates whomToSnoop operations 1700 for a case when a cogran is accessed and an SFT lookup is performed to determine whether a snoop is needed. The operations 1700 are used to determine which agents need or may need to be snooped to maintain cache coherence. If the lookup does not find an SFT entry that's tracking the cogran (i.e., SFT miss), then no snoop is needed. If the lookup finds an SFT entry that's tracking the cogran (i.e., SFT hit), the SFT performs the operations 1700 to determine the set of agents that need to be or may need to be snooped.

An operation 1702 determines the tracking_mode of the SFT entry. If the tracking_mode is IMPRECISE, an operation 1704 generates a snoop to all agents indicated by imprecise tracking. If the tracking_mode is AID, an operation 1706 initializes a full tracking vector to all zeros, an operation 1708 decodes the valid AIDs currently held by the SFT entry to find their equivalent full tracking vector bit positions and sets those bits in the full tracking vector, and an operation 1710 sends snoop to all agents whose full tracking vector bit is set. If the tracking_mode is PVEC, an operation 1712 forms a full tracking vector (such as disclosed above in FIG. 14) and operation 1710 sends snoop to all agents whose full tracking vector bit is set.

Figure 18:
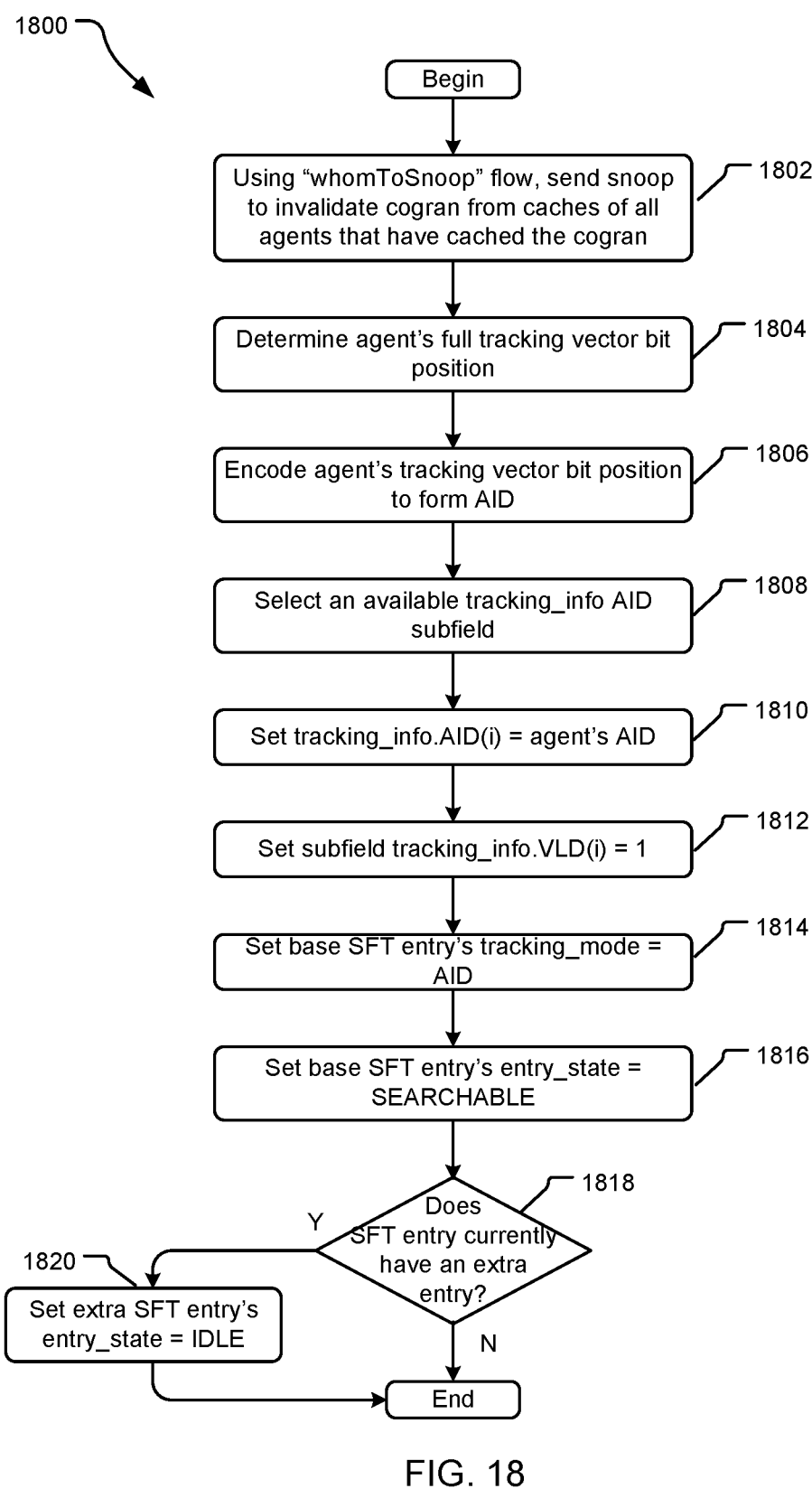
FIG. 18 illustrates example operations for a case when an agent may demand exclusive access to a cogran such that all other cached copies are invalidated.

FIG. 18 illustrates operations 1800 for a case when an agent may demand exclusive access to a cogran such that all other cached copies are invalidated, for example, so that the agent may update its copy of the cogran in a way that preserves cache coherence. Specifically, the operations 1800 may be used when the SFT is already tracking a cogran at the time the agent demands to have exclusive access to that cogran. An operation 1802 may use the whomToSnoop operations 1700 of FIG. 17 to send snoops to invalidate the cogran from caches of all agents that have cached the cogran.

An operation 1804 determines that agent's full tracking vector bit position and an operation 1806 encodes the agent's full tracking vector bit position to form the AID that identifies that agent. An operation 1808 selects an available tracking_info AID subfield, an operation 1810 sets the tracking_info.AID(i) subfield to agent's AID and an operation 1812 sets the tracking_info.VLD(i) subfield to 1. An operation 1814 sets the base SFT entry's tracking_mode to AID and operation 1816 sets the base SFT entry's entry_s-tate to SEARCHABLE. An operation 1818 determines if the SFT entry currently has an extra SFT entry. If so, an operation 1820 sets the extra SFT entry's entry_state=IDLE.

The cache coherence system disclosed herein provides substantial efficiencies in use of SFT. For example, for the implementations disclosed herein with having 128 agents that need to be able to be tracked by a snoop filter and the ability to split that vector into 4 partial vectors, the SFT described herein is fifty (50) % smaller than prior art SFTs that carry the full tracking vector in each SFT entry and eleven (11) % smaller than an alternative SFT that carries a portion of the full tracking vector in a base entry and the remainder of the full tracking vector in an extra entry. When a datacenter scheduling SW is able to achieve its goal of assigning CPU cores for virtual machines (VMs) in a way that keeps the CPUs of a VM somewhat physically near each other, the technology disclosed herein provides advantage of reduction in SFT entry bit count and additionally, the technology disclosed herein provides the advantage over existing prior art in precisely tracking all the sharer agents of a cogran that a VM has when the VM is contained to a single CPU cluster.

An implementation discloses a method including generating a full tracking vector wherein each bit of the full tracking vector indicates cache validity state of a coherence granule (cogran) in agent cache for a related agent, dividing the tracking vector into a plurality of partial vectors (PVECs), for each PVEC, determining whether cache validity state of at least one bit in the PVEC is set to valid, and in response to determining that cache validity state of at least one bit in a given PVEC is set to valid, storing the given PVEC and its PVEC pointer in a tracking_info field of a base snoop filter (SFT) entry for the cogran, wherein the PVEC pointer indicates the location of the given PVEC in the full tracking vector.

Figure 19:
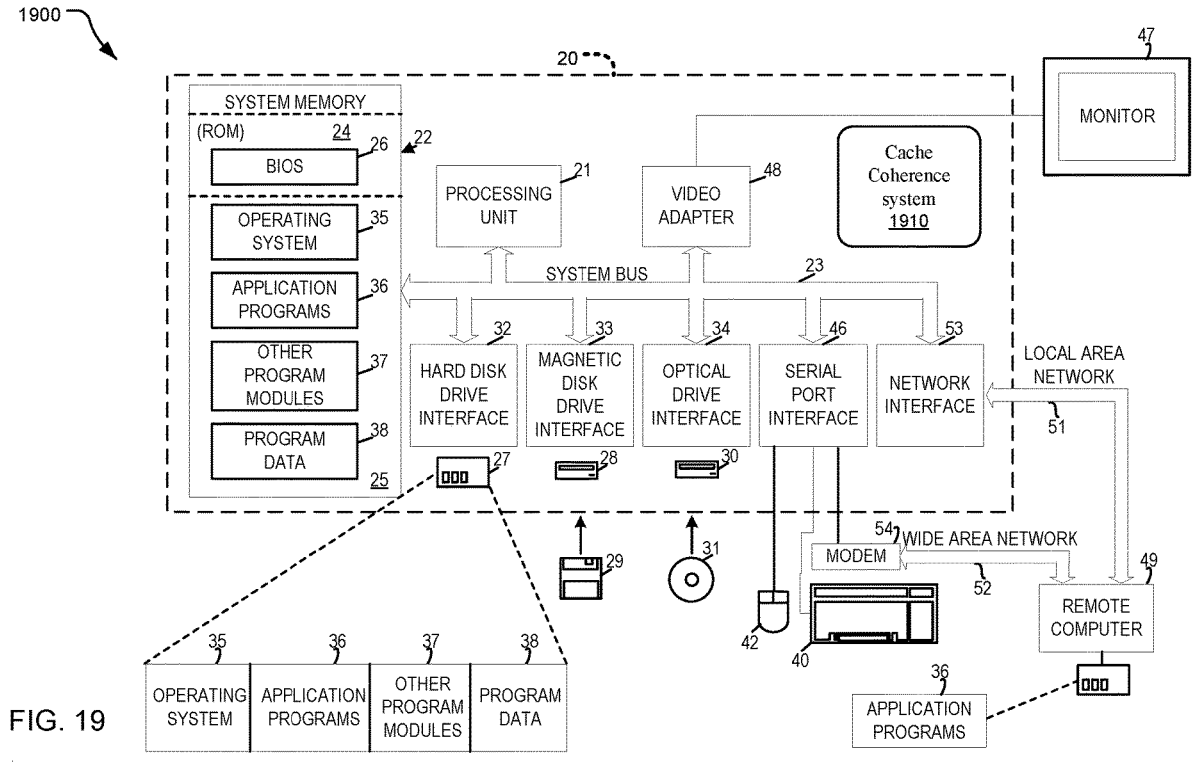
FIG. 19 illustrates an example system that may be useful in implementing the cache coherence system disclosed herein.

FIG. 19 illustrates an example system 1900 that may be useful in implementing the cache coherence system disclosed herein. The example hardware and operating environment of FIG. 19 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 19, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a cache coherence system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIGS. 9-18. Similarly, instructions stored on the memory of the computer 20 may also be used to implement one or more operations of FIGS. 9-18. The memory of the computer 20 may also store one or more instructions to implement the cache coherence system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 19 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for the cache coherence system 1910 may be stored in system memory 22 and/or storage devices 29 or 31 and processed by the processing unit 21. Cache coherence system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of the cache coherence system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The cache coherence system disclosed herein may include a variety of tangible computer-readable storage media and intangible computer-readable communication signals. Tangible computer-readable storage can be embodied by any available media that can be accessed by the cache coherence system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the cache coherence system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

A system disclosed herein includes a memory, one or more processor units, and a cache coherence system stored in the memory and executable by the one or more processor units, the cache coherence system encoding computer-executable instructions on the memory for executing on the one or more processor units a computer process, the computer process including generating a full tracking vector wherein each bit of the full tracking vector indicates cache validity state of a coherence granule (cogran) in agent cache for a related agent, dividing the tracking vector into a plurality of partial vectors (PVECs), for each PVEC, determining whether cache validity state of at least one bit in the PVEC is set to valid, and in response to determining that cache validity state of at least one bit in a given PVEC is set to valid, storing the given PVEC and its PVEC pointer in a tracking_info field of a base snoop filter (SFT) entry for the cogran, wherein the PVEC pointer indicates the location of the given PVEC in the full tracking vector.

An alternative implementation discloses one or more physically manufactured computer-readable storage media, encoding computer-executable instructions for executing on a computer system a computer process, the computer process including generating a full tracking vector wherein each bit of the full tracking vector indicates cache validity state of a coherence granule (cogran) in agent cache for a related agent, dividing the tracking vector into a plurality of partial vectors (PVECs), for each PVEC, determining whether cache validity state of at least one bit in the PVEC is set to valid, and in response to determining that cache validity state of at least one bit in a given PVEC is set to valid, storing the given PVEC and its PVEC pointer in a tracking_info field of a base snoop filter (SFT) entry for the cogran, wherein the PVEC pointer indicates the location of the given PVEC in the full tracking vector.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
generating a full tracking vector wherein each bit of the full tracking vector indicates cache validity state of a coherence granule (cogran) in an agent cache for a related agent;
dividing the full tracking vector into a plurality of partial vectors (PVECs);
for each PVEC, determining whether a cache validity state of at least one bit in the PVEC is set to valid; and
in response to determining that the cache validity state of at least one bit in a given PVEC is set to valid, storing the given PVEC and an associated PVEC pointer in a tracking_info field of a base snoop filter (SFT) entry for the cogran and setting a summary bit related to the PVEC vector to one (1), wherein the associated PVEC pointer indicates the location of the given PVEC in the full tracking vector.

2. The method of claim 1, further comprising changing a tracking_mode of the base SFT entry to PVEC.

3. The method of claim 1, wherein dividing the full tracking vector into a plurality of PVECs further comprises dividing the full tracking vector into four PVECs.

4. The method of claim 1, further comprising:
determining that more than one PVECs of the full tracking vector have at least one bit set to valid; and
in response to determining that more than one partial vectors of the full tracking vector have at least one bit set to valid, acquiring an available SFT entry as an extra SFT entry, and storing an additional PVEC and its PVEC pointer in a tracking_info field of the extra SFT entry.

5. The method of claim 4, further comprising changing an entry_state of the base SFT entry to SEARCHABLE_E and changing an entry_state of the extra SFT entry to EXTRA.

6. The method of claim 1, further comprising:
determining that an extra SFT entry is unable to store any more PVECs; and
in response to determining that the extra SFT entry is unable to store any more PVECs, changing a tracking-_mode of the base SFT entry to IMPRECISE.

7. The method of claim 1, further comprising, in response to determining that more than one PVECs has a PVEC summary bit set to one, setting an entry_state of the base SFT entry to SEARCHABLE_E.

8. The method of claim 1, wherein the full tracking vector tracks 128 agents and each PVEC has 32 bits.

9. One or more tangible computer-readable storage media, encoding computer-executable instructions for executing on a computer system a computer process, the computer process comprising:

generating a full tracking vector wherein each bit of the full tracking vector indicates cache validity state of a coherence granule (cogran) in an agent cache for a related agent;
dividing the full tracking vector into a plurality of partial vectors (PVECs);
for each PVEC, determining whether a cache validity state of at least one bit in the PVEC is set to valid; and
in response to determining that a cache validity state of at least one bit in a given PVEC is set to valid, storing the given PVEC and an associated PVEC pointer in a tracking_info field of a base snoop filter (SFT) entry for the cogran and setting a summary bit related to the PVEC vector to one (1), wherein the associated PVEC pointer indicates the location of the given PVEC in in the full tracking vector.

10. The one or more tangible computer-readable storage media of claim 9, wherein the computer process further comprises changing a tracking_mode of the base SFT entry to PVEC.

11. The one or more tangible computer-readable storage media of claim 9, wherein dividing the full tracking vector into a plurality of PVECs further comprises dividing the full tracking vector into four PVECs.

12. The one or more tangible computer-readable storage media of claim 9, wherein the computer process further comprises:
determining that more than one PVECs of the full tracking vector have at least one bit set to valid; and
in response to determining that more than one partial vectors of the full tracking vector have at least one bit set to valid, acquiring an available SFT entry as an extra SFT entry, and storing an additional PVEC and its PVEC pointer in a tracking_info field of the extra SFT entry.

13. The one or more physically tangible computer-readable storage media of claim 12, wherein the computer process further comprises changing an entry_state of the base SFT entry to SEARCHABLE_E and changing an entry_state of the extra SFT entry to EXTRA.

14. The one or more tangible computer-readable storage media of claim 9, wherein the computer process further comprises:
determining that an extra SFT entry is unable to store any more PVECs; and
in response to determining that the extra SFT entry is unable to store any more PVECs, changing a tracking-_mode of the base SFT entry to IMPRECISE.

15. The one or more tangible computer-readable storage media of claim 9, wherein the computer process further comprises in response to determining that more than one PVECs has a PVEC summary bit set to one, setting an entry_state of the base SFT entry to SEARCHABLE_E.

16. A system comprising:
memory;
one or more processor units; and
a cache coherence system stored in the memory and executable by the one or more processor units, the cache coherence system encoding computer-executable instructions on the memory for executing on the one or more processor units a computer process, the computer process comprising:
generating a full tracking vector wherein each bit of the full tracking vector indicates a cache validity state of a coherence granule (cogran) in an agent cache for a related agent;

dividing the tracking vector into a plurality of partial vectors (PVECs);

for each PVEC, determining whether a cache validity state of at least one bit in the PVEC is set to valid; and in response to determining that a cache validity state of at least one bit in a given PVEC is set to valid, storing the given PVEC and an associated PVEC pointer in a tracking_info field of a base snoop filter (SFT) entry for the cogran and setting a summary bit related to the PVEC vector to one (1), wherein the associated PVEC pointer indicates the location of the given PVEC in in the full tracking vector.

17. The system of claim 16, wherein the computer process further comprises changing a tracking_mode of the base SFT entry to PVEC.

18. The system of claim 16, wherein dividing the full tracking vector into a plurality of PVECs further comprises dividing the full tracking vector into four PVECs.

19. The system of claim 18, wherein the computer process further comprises:

determining that more than one PVECs of the full tracking vector have at least one bit set to valid; and in response to determining that more than one partial vectors of a full tracking vector have at least one bit set to valid, acquiring an available SFT entry as an extra SFT entry, and storing an additional PVEC and its PVEC pointer in a tracking_info field of the extra SFT entry.

20. The system of claim 16, wherein the computer process further comprises, in response to determining that a cache validity state of one or more of the PVECs are set to valid, storing the one or more PVECs in the base entry.

* * * * *